United States Patent
Policicchio

(10) Patent No.: US 12,201,253 B2
(45) Date of Patent: Jan. 21, 2025

(54) CLEANING ARTICLE WITH DIFFERENTIAL SIZED TOW TUFTS

(71) Applicant: The Procter & Gamble Company, Cincinnati, OH (US)

(72) Inventor: Nicola John Policicchio, Mason, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 17/743,918

(22) Filed: May 13, 2022

(65) Prior Publication Data

US 2022/0273153 A1  Sep. 1, 2022

Related U.S. Application Data

(63) Continuation of application No. 15/943,741, filed on Apr. 3, 2018, now Pat. No. 11,375,867.

(51) Int. Cl.
*A47L 13/16* (2006.01)
*A47L 13/20* (2006.01)
(Continued)

(52) U.S. Cl.
CPC ............... *A47L 13/16* (2013.01); *A47L 13/20* (2013.01); *A47L 13/38* (2013.01); *B32B 3/02* (2013.01); *B32B 3/10* (2013.01); *B32B 3/26* (2013.01); *B32B 3/263* (2013.01); *B32B 3/266* (2013.01); *B32B 5/12* (2013.01); *B32B 5/26* (2013.01); *B32B 5/266* (2021.05); *B32B 5/267* (2021.05);
(Continued)

(58) Field of Classification Search
CPC .......... A47L 13/16; A47L 13/20; A47L 13/38; Y10T 428/23907; Y10T 428/23929; Y10T 428/23936; B32B 2432/00; B32B 3/02; B32B 3/10; B32B 3/26; B32B 3/263; B32B 3/266; B32B 5/12; B32B 5/26; B32B 5/266; B32B 5/267; B32B 7/05
See application file for complete search history.

(56) References Cited

U.S. PATENT DOCUMENTS

| 823,725 A | 6/1906 | Hayden |
| 4,145,787 A | 3/1979 | Bastian |

(Continued)

FOREIGN PATENT DOCUMENTS

| EP | 0923902 A3 | 11/1999 |
| JP | 2000316772 A | 11/2000 |

(Continued)

OTHER PUBLICATIONS

All Office Actions, U.S. Appl. No. 15/943,739.
(Continued)

*Primary Examiner* — Cheryl Juska
(74) *Attorney, Agent, or Firm* — Gary J. Foose

(57) ABSTRACT

A cleaning article defining an XY plane and a Z direction perpendicular to the plane. The cleaning article has discrete tufts of tow fibers bonded to a carrier sheet by primary bonds. The discrete tufts have secondary bond lines external to the tufts. The secondary bond lines interrupt the Z-direction thickness of the tufts, to provide channels for improved collection and retention of debris from a target surface. The tufts are created by slits between the primary bonds and secondary bonds, which yield plural tuft sizes. The slits may be transversely unequally spaced between adjacent bonds.

13 Claims, 38 Drawing Sheets

(51) Int. Cl.
*A47L 13/38* (2006.01)
*B32B 3/02* (2006.01)
*B32B 3/10* (2006.01)
*B32B 3/26* (2006.01)
*B32B 5/12* (2006.01)
*B32B 5/26* (2006.01)
*B32B 7/05* (2019.01)

(52) U.S. Cl.
CPC ............ *B32B 7/05* (2019.01); *B32B 2432/00* (2013.01); *Y10T 428/23907* (2015.04); *Y10T 428/23929* (2015.04); *Y10T 428/23936* (2015.04)

(56) References Cited

U.S. PATENT DOCUMENTS

| | | | |
|---|---|---|---|
| 5,691,035 | A | 11/1997 | Chappell et al. |
| 6,143,393 | A | 11/2000 | Abe et al. |
| 6,241,835 | B1 | 6/2001 | Abe et al. |
| 6,245,413 | B1 | 6/2001 | Kenmochi et al. |
| 6,319,593 | B1 | 11/2001 | Kenmochi et al. |
| 6,329,308 | B1 | 12/2001 | Kenmochi et al. |
| 6,550,092 | B1 | 4/2003 | Brown et al. |
| 6,554,937 | B1 | 4/2003 | Kenmochi et al. |
| 6,774,070 | B1 | 8/2004 | Kenmochi et al. |
| 6,777,064 | B1 | 8/2004 | Brown et al. |
| 6,797,357 | B2 | 9/2004 | Fereshtehkhou et al. |
| 6,813,801 | B2 | 11/2004 | Tanaka et al. |
| 6,936,330 | B2 | 8/2005 | Fereshtehkhou et al. |
| 6,984,615 | B2 | 1/2006 | Kenmochi et al. |
| 7,003,856 | B2 | 2/2006 | Hayashi et al. |
| 7,291,359 | B2 | 11/2007 | Haskett et al. |
| 7,302,729 | B2 | 12/2007 | Tanaka |
| 7,386,907 | B2 | 6/2008 | Otsuka et al. |
| 7,560,398 | B2 | 7/2009 | Zillig et al. |
| 7,566,671 | B2 | 7/2009 | Hoadley et al. |
| 7,682,686 | B2 | 3/2010 | Curro et al. |
| 7,712,178 | B2 | 5/2010 | Yamada |
| 7,779,502 | B2 | 8/2010 | Fujiwara et al. |
| 7,786,030 | B2 | 8/2010 | Tsuchiya |
| 7,803,726 | B2 | 9/2010 | Policicchio et al. |
| 7,838,099 | B2 | 11/2010 | Curro et al. |
| 7,870,635 | B2 | 1/2011 | Yamada |
| 7,937,797 | B2 | 5/2011 | Tsuchiya et al. |
| 8,075,977 | B2 | 12/2011 | Curro et al. |
| 8,146,197 | B2 | 4/2012 | Yamada |
| 8,151,402 | B2 | 4/2012 | Takabayashi et al. |
| 8,161,594 | B2 | 4/2012 | Policicchio et al. |
| 8,186,001 | B2 | 5/2012 | Tsuchiya et al. |
| 8,225,453 | B2 | 7/2012 | Yamada |
| 8,245,349 | B2 | 8/2012 | Tsuchiya et al. |
| 8,528,151 | B2 | 9/2013 | Przepasniak |
| 8,536,074 | B2 | 9/2013 | Fereshtehkhou et al. |
| 8,617,685 | B2 | 12/2013 | Yamada |
| 8,621,704 | B2 | 1/2014 | Tsuchiya et al. |
| 8,646,144 | B2 | 2/2014 | Wada et al. |
| 8,752,232 | B2 | 6/2014 | Otsuka et al. |
| 8,756,746 | B2 | 6/2014 | Policicchio |
| 8,763,197 | B2 | 7/2014 | Policicchio et al. |
| 8,793,832 | B2 | 8/2014 | Yamada |
| 8,851,776 | B2 | 10/2014 | Schwarz et al. |
| 9,113,768 | B2 | 8/2015 | Wada et al. |
| 9,198,553 | B2 | 12/2015 | Policicchio |
| 9,204,775 | B2 | 12/2015 | Pung et al. |
| 9,296,176 | B2 | 3/2016 | Escaffre et al. |
| 9,339,165 | B2 | 5/2016 | Vetter et al. |
| 10,722,091 | B2 | 7/2020 | Policicchio |
| 10,730,081 | B2 | 8/2020 | Policicchio |
| 11,045,061 | B2 | 6/2021 | Policicchio |
| 11,253,128 | B2 | 2/2022 | Policicchio et al. |
| 2002/0065012 | A1 | 5/2002 | Takabayashi et al. |
| 2002/0148061 | A1 | 10/2002 | Tanaka |
| 2006/0171764 | A1 | 8/2006 | Hoadley |
| 2006/0185108 | A1 | 8/2006 | Hoadley et al. |
| 2007/0077403 | A1 | 4/2007 | Litvay |
| 2008/0028560 | A1 | 2/2008 | Policicchio et al. |
| 2008/0235890 | A1 | 10/2008 | Tsuchiya et al. |
| 2009/0007355 | A1 | 1/2009 | Policicchio et al. |
| 2010/0015383 | A1 | 1/2010 | Yamada |
| 2010/0088837 | A1 | 4/2010 | Wada et al. |
| 2010/0154156 | A1 | 6/2010 | Takabayashi et al. |
| 2011/0088189 | A1 | 4/2011 | Wada |
| 2011/0277258 | A1 | 11/2011 | Otsuka |
| 2012/0297563 | A1 | 11/2012 | Tsuchiya et al. |
| 2012/0311803 | A1 | 12/2012 | Yamada |
| 2014/0182767 | A1 | 7/2014 | Goto et al. |
| 2014/0187406 | A1 | 7/2014 | Matsumoto et al. |
| 2015/0336366 | A1 | 11/2015 | Matsumoto et al. |
| 2015/0351602 | A1 | 12/2015 | Goto |
| 2015/0374196 | A1 | 12/2015 | Suda |
| 2017/0360271 | A1 | 12/2017 | Policicchio |
| 2018/0042439 | A1 | 2/2018 | Policicchio |
| 2019/0075993 | A1 | 3/2019 | Policicchio et al. |
| 2019/0075994 | A1 | 3/2019 | Policicchio |
| 2019/0075995 | A1 | 3/2019 | Policicchio |
| 2019/0076886 | A1 | 3/2019 | Policicchio |
| 2019/0104909 | A1 | 4/2019 | Policicchio |
| 2019/0298140 | A1 | 10/2019 | Policicchio |
| 2019/0298141 | A1 | 10/2019 | Policicchio |
| 2019/0298142 | A1 | 10/2019 | Policicchio |
| 2019/0343365 | A1 | 11/2019 | Tsuchiya et al. |

FOREIGN PATENT DOCUMENTS

| | | |
|---|---|---|
| WO | 2008146821 A1 | 12/2008 |
| WO | 2009084500 A1 | 7/2009 |

OTHER PUBLICATIONS

All Office Actions, U.S. Appl. No. 15/943,740.
All Office Actions, U.S. Appl. No. 15/943,741.
International Search Report and Written Opinion; Application Ser. No. PCT/US2019/023578; dated Jun. 17, 2019, 16 pages.
All Office Actions; U.S. Appl. No. 18/407,859, filed Jan. 9, 2024.
Unpublished U.S. Appl. No. 18/407,859, filed Jan. 9, 2024, to Nicola John Policicchio.

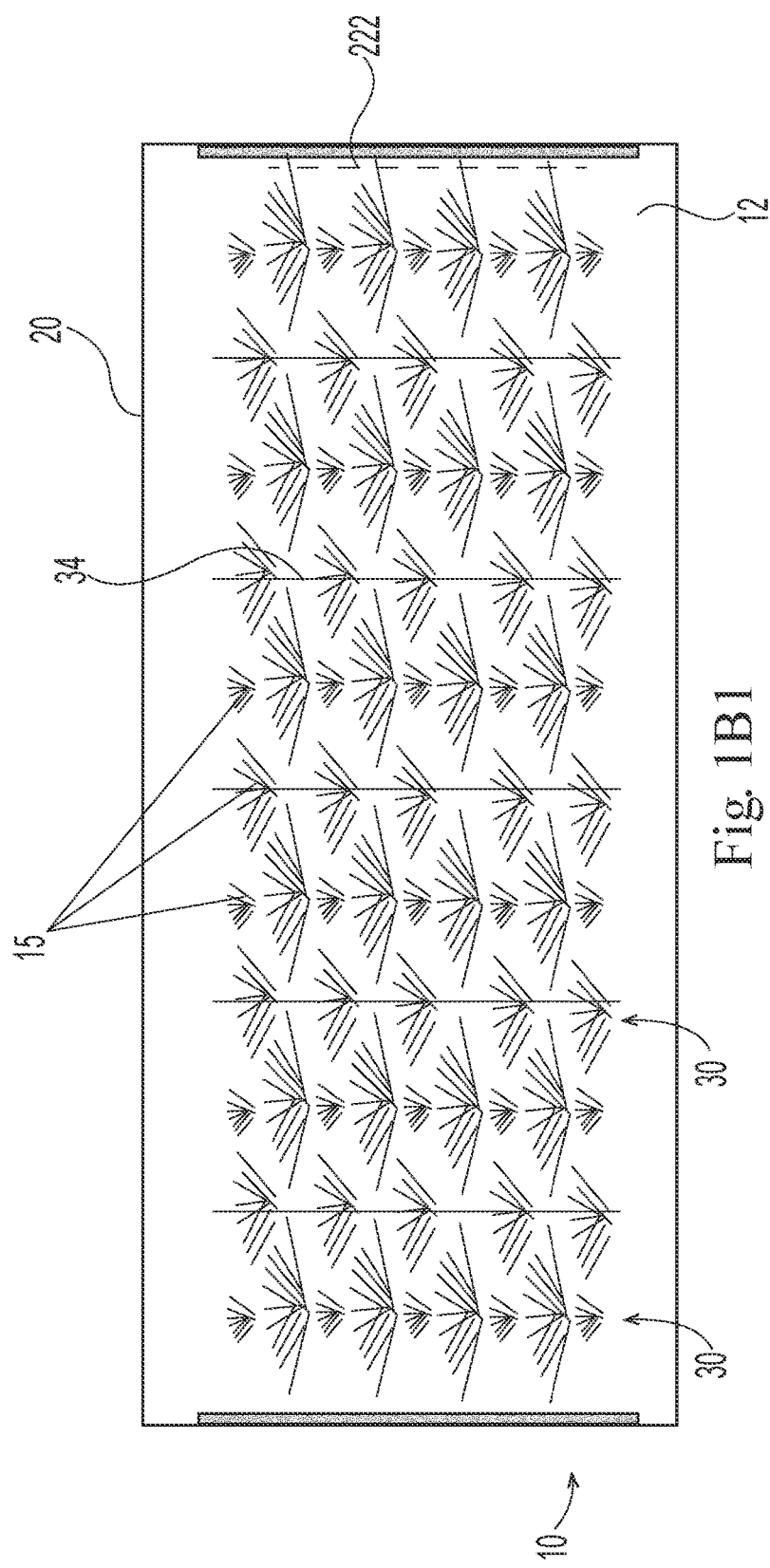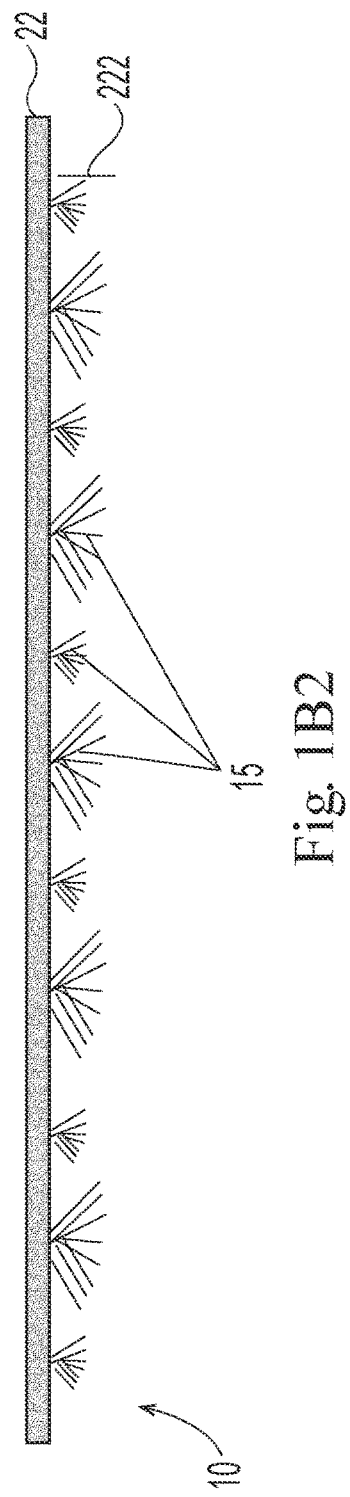
Fig. 1B1
Fig. 1B2

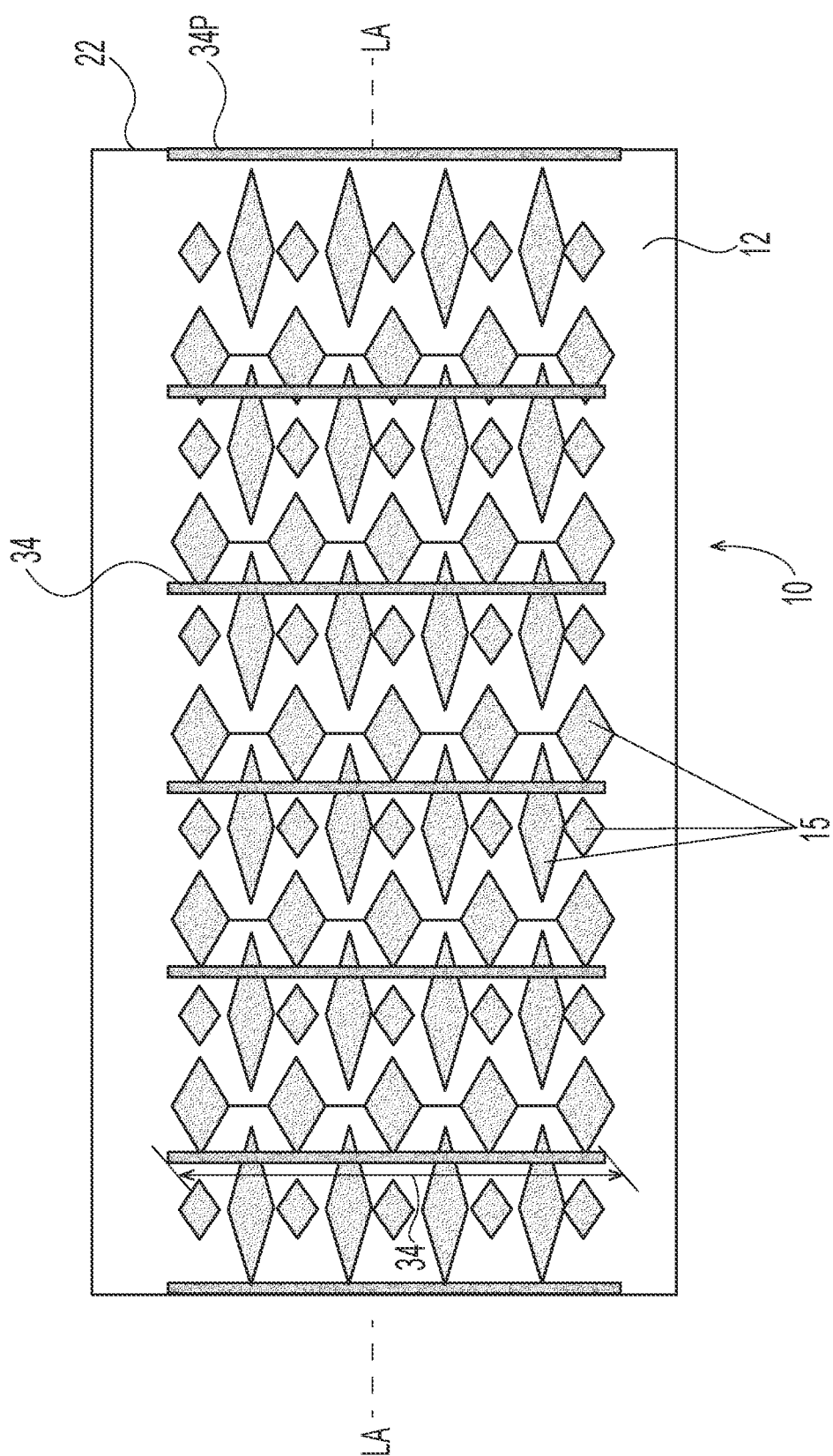

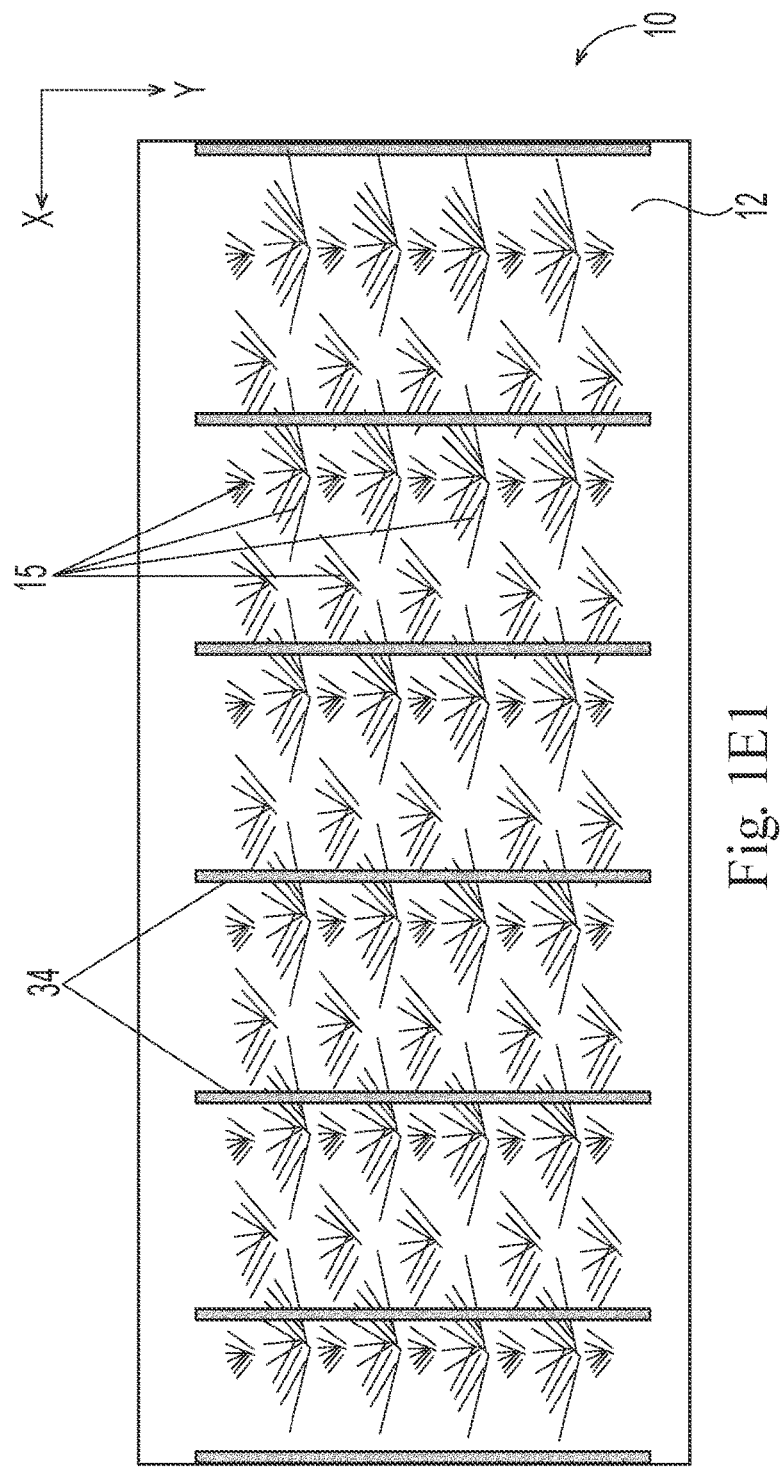
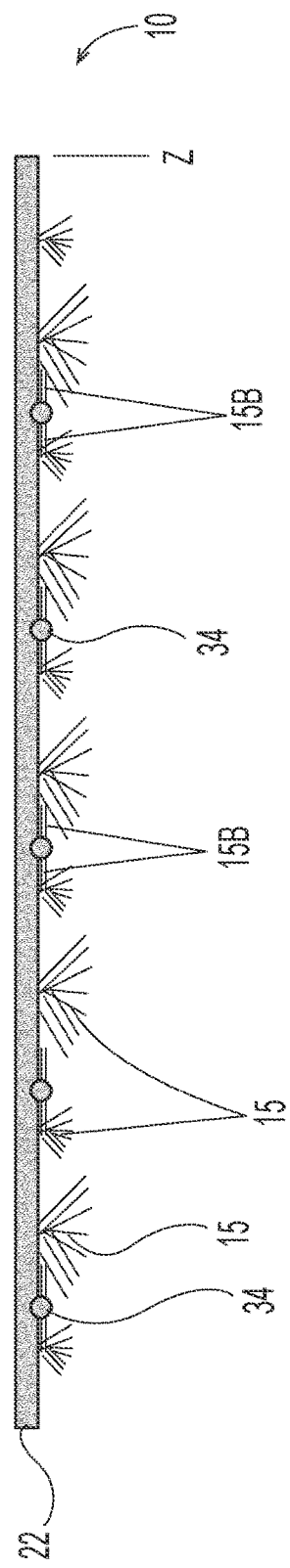
Fig. 1E1
Fig. 1E2

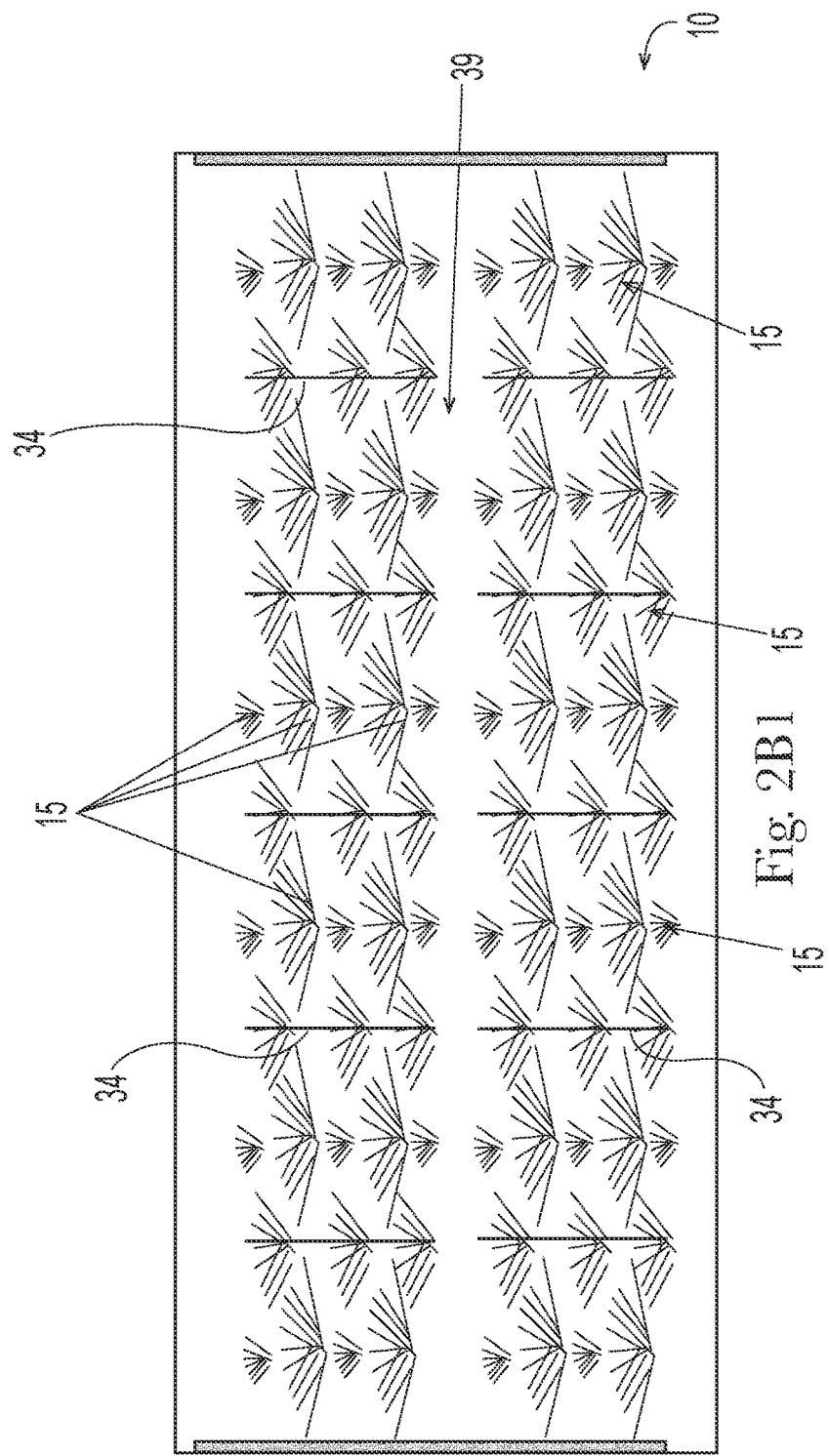
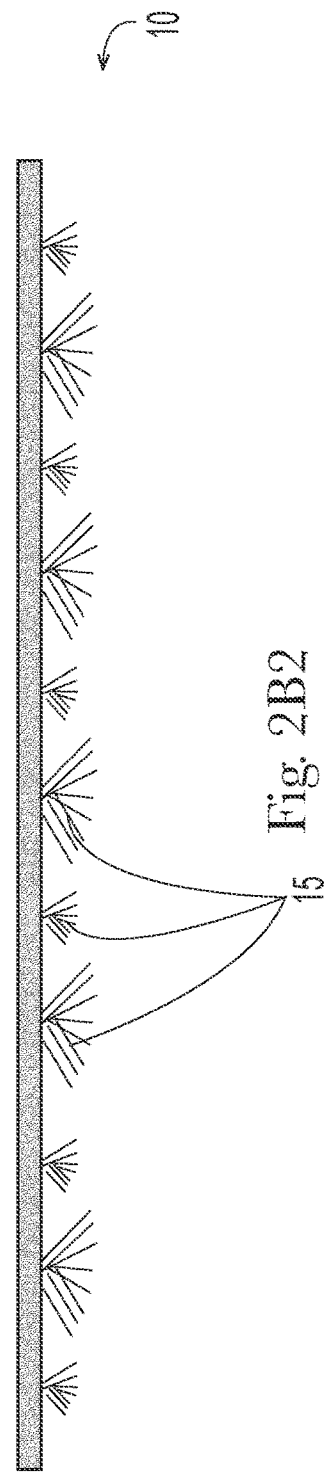

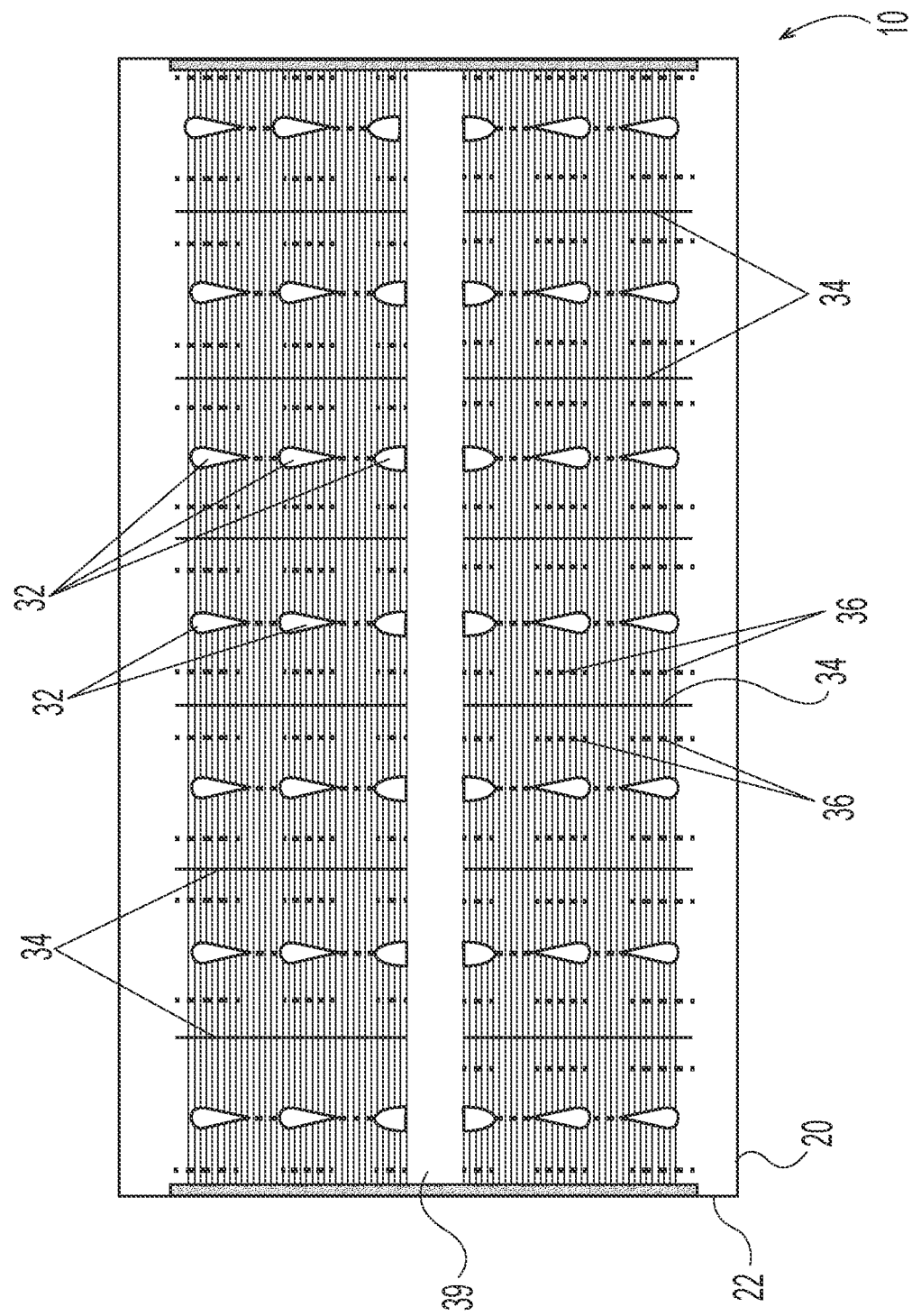

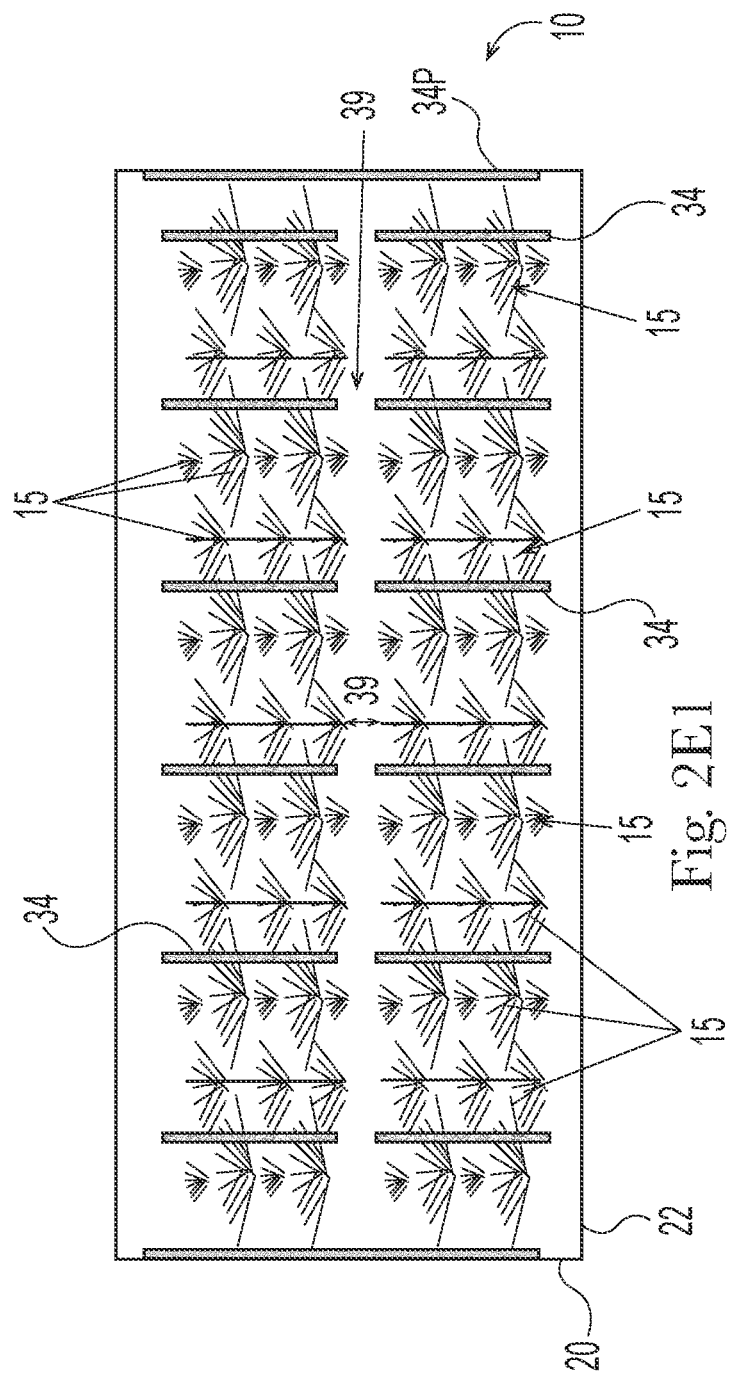
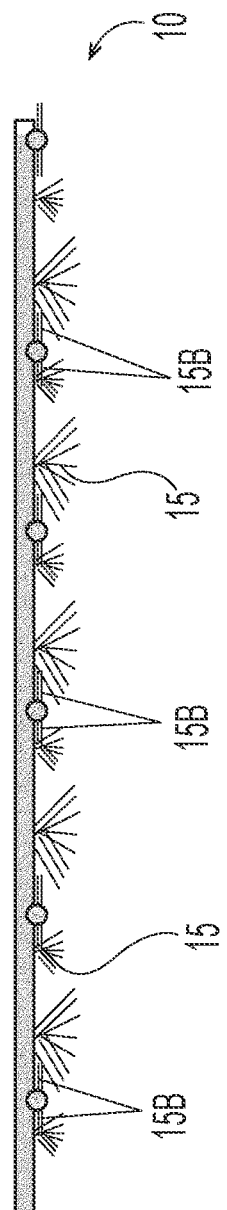
Fig. 2E1
Fig. 2E2

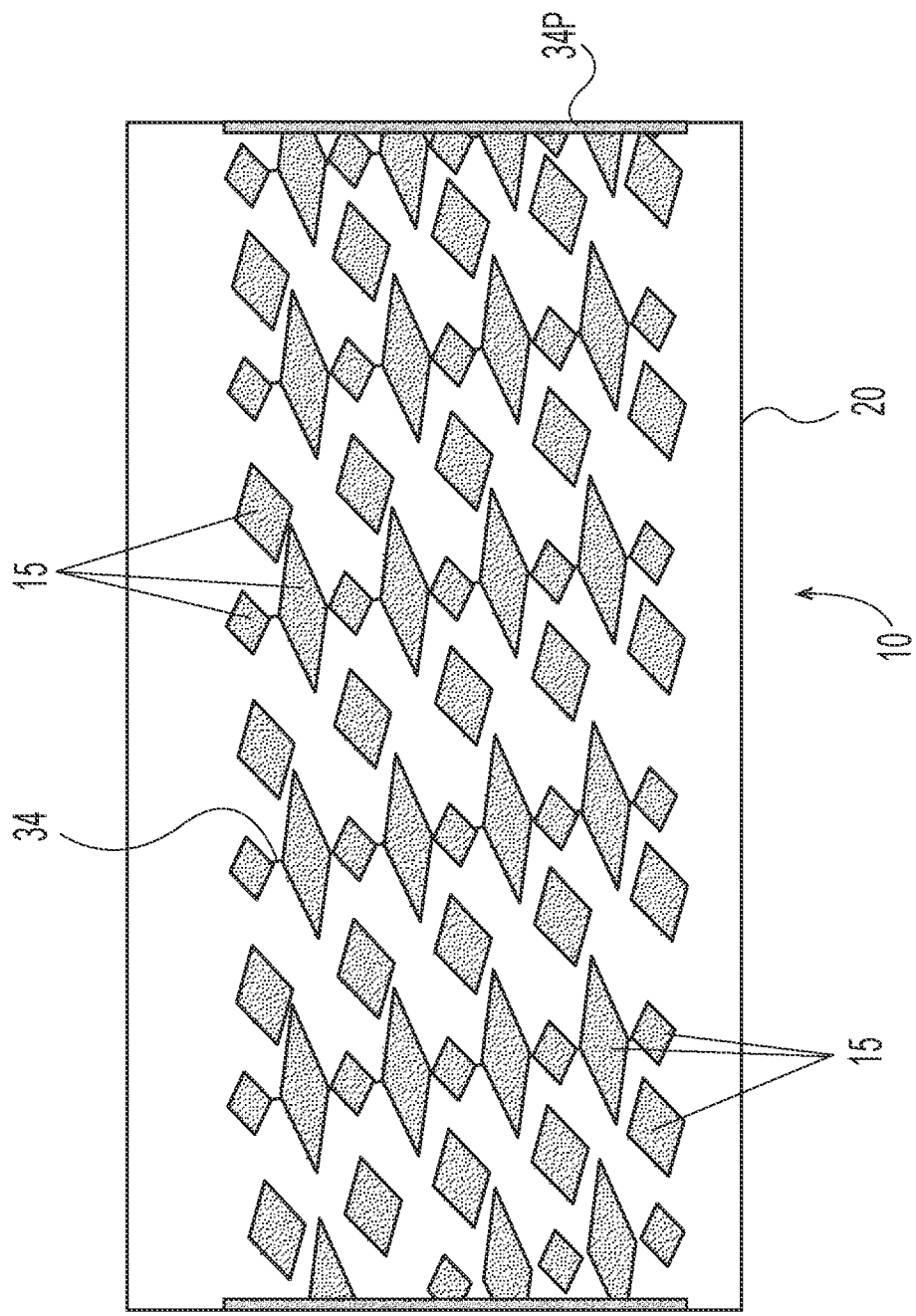

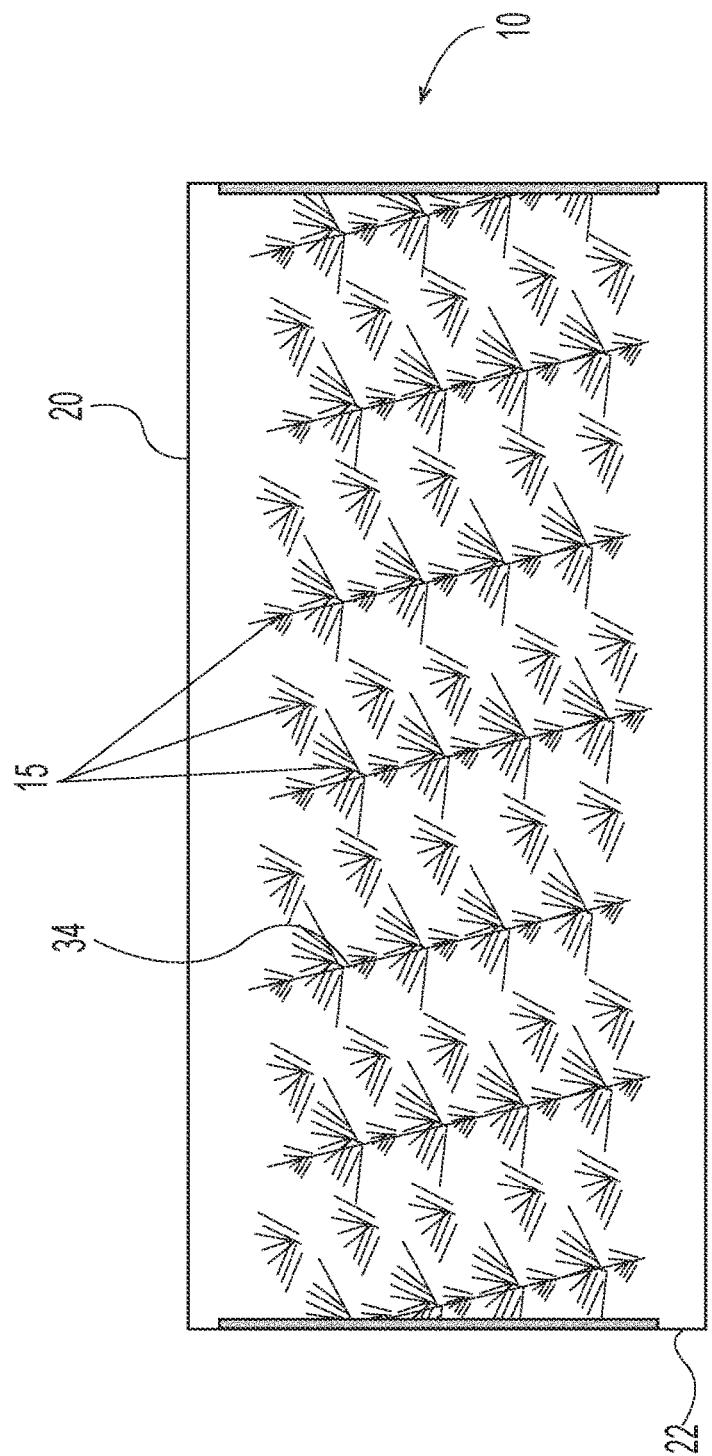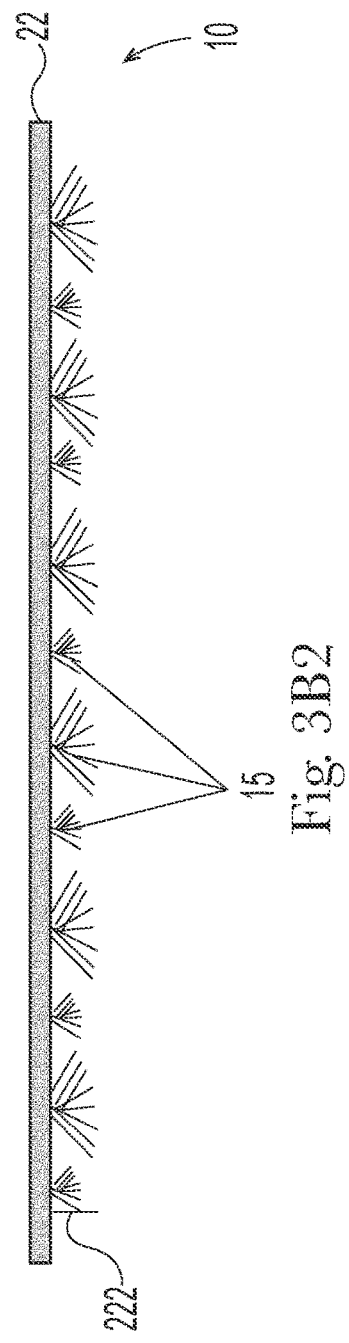

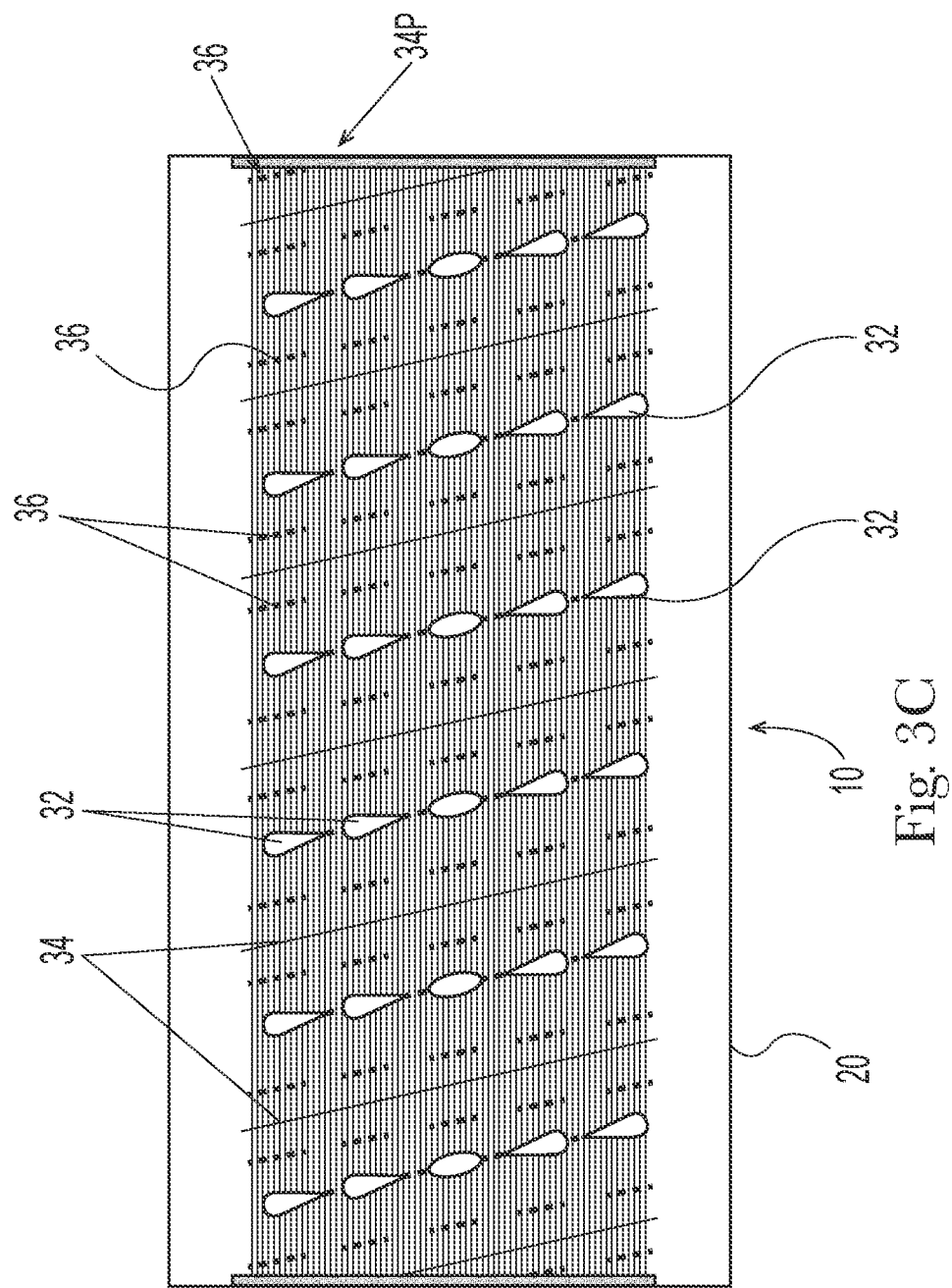

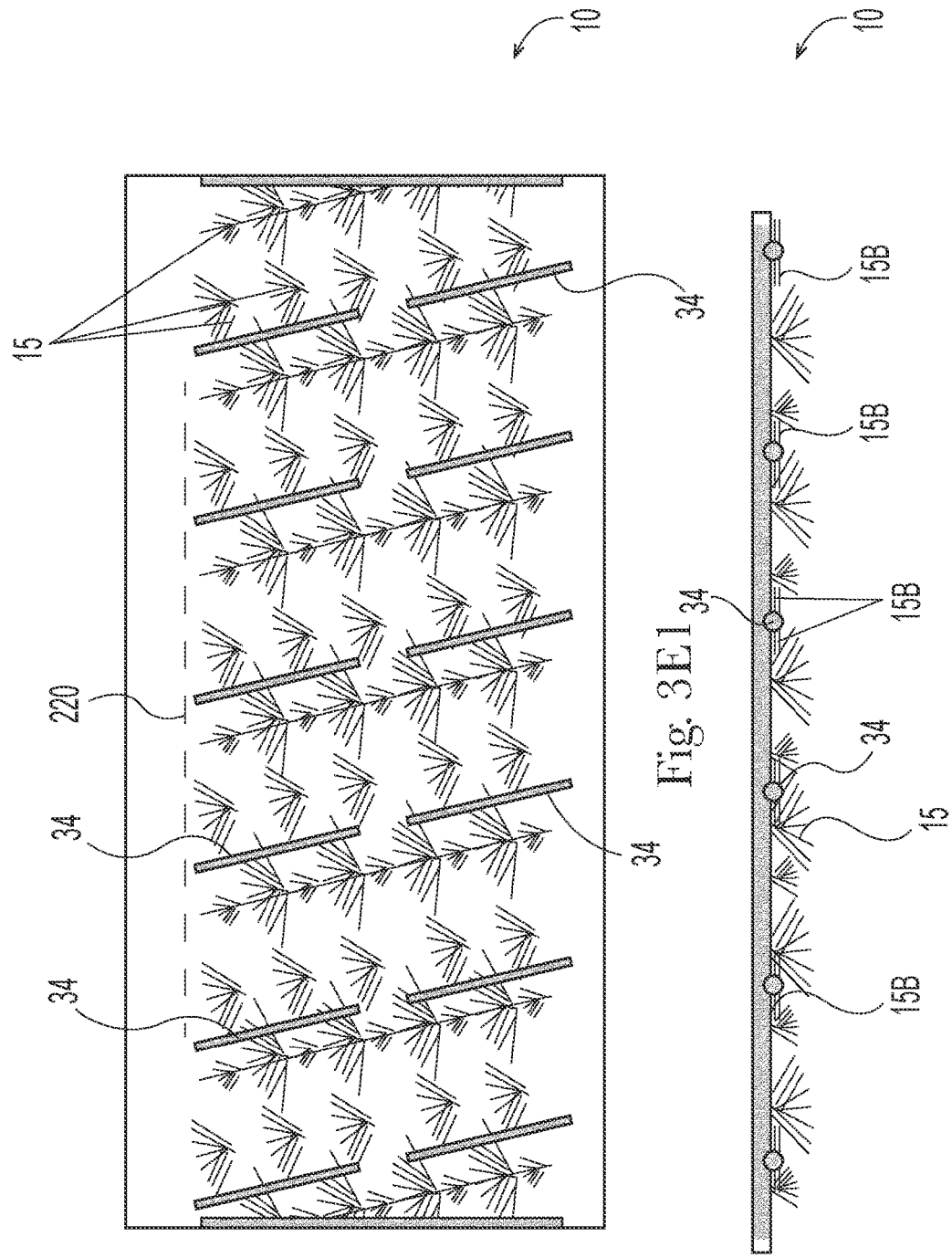

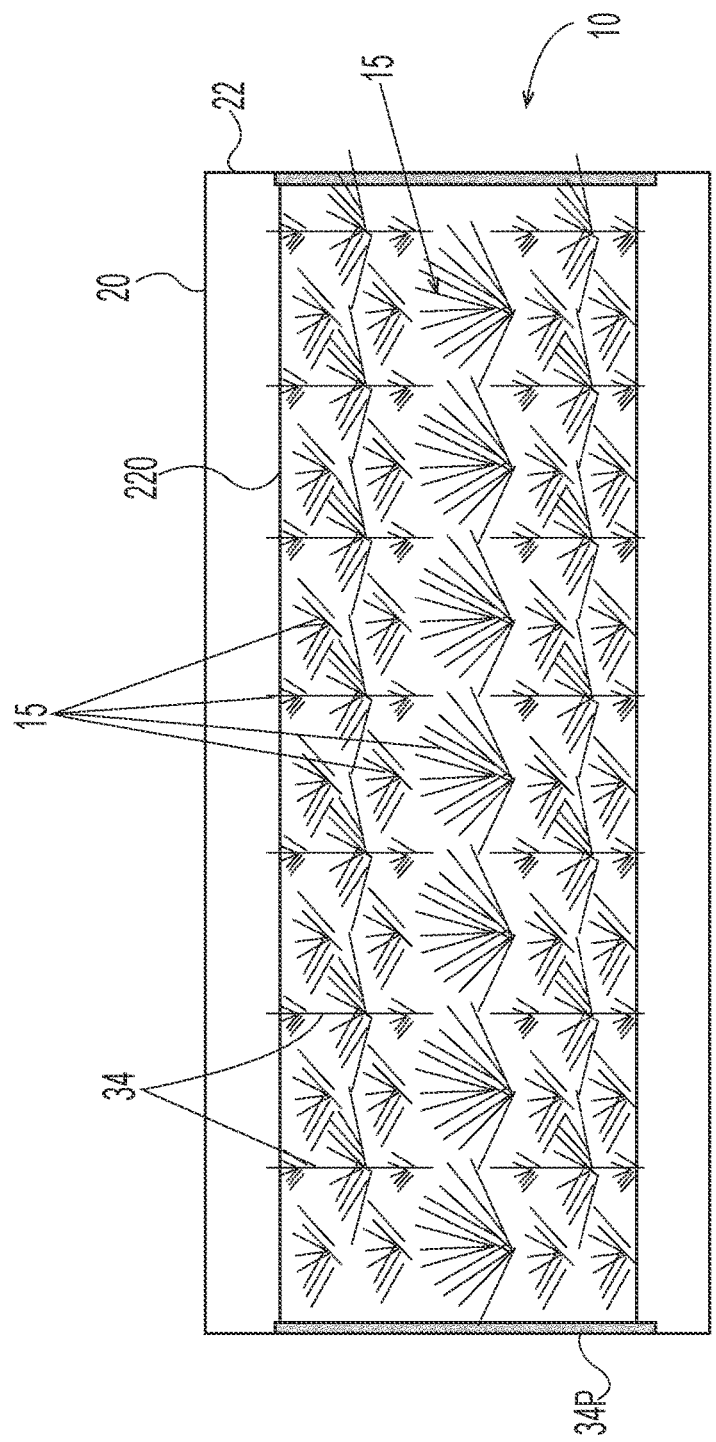
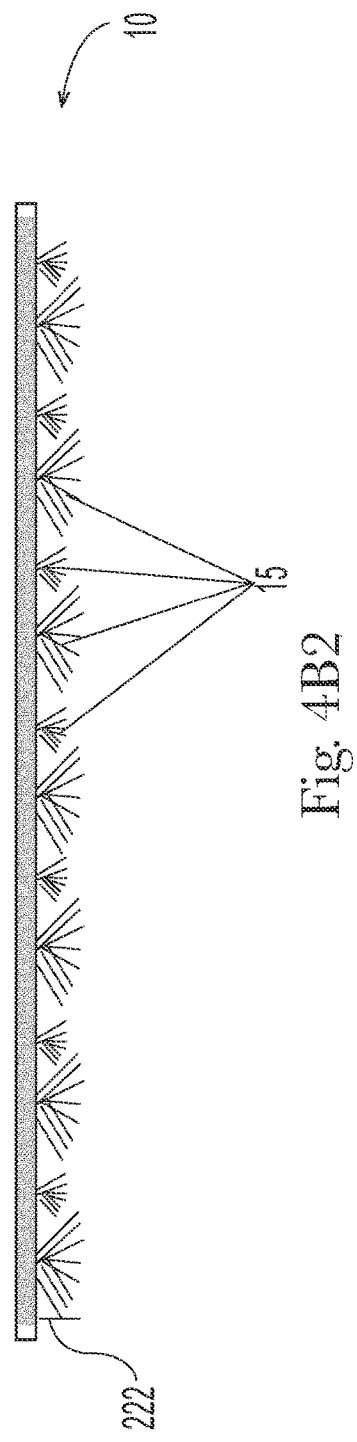
Fig. 4B1
Fig. 4B2

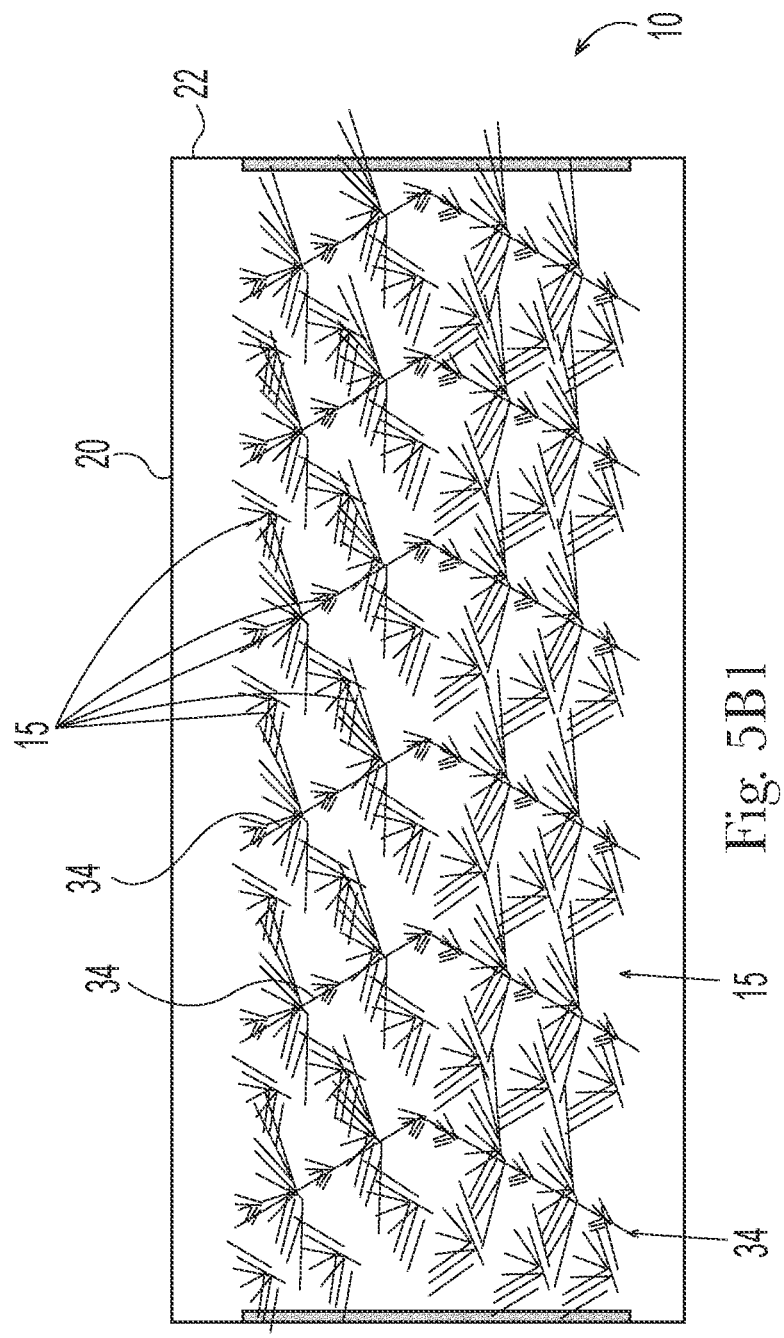
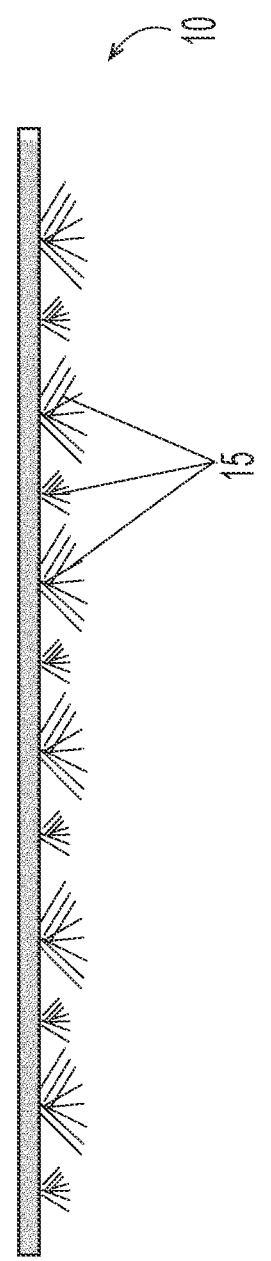
Fig. 5B1
Fig. 5B2

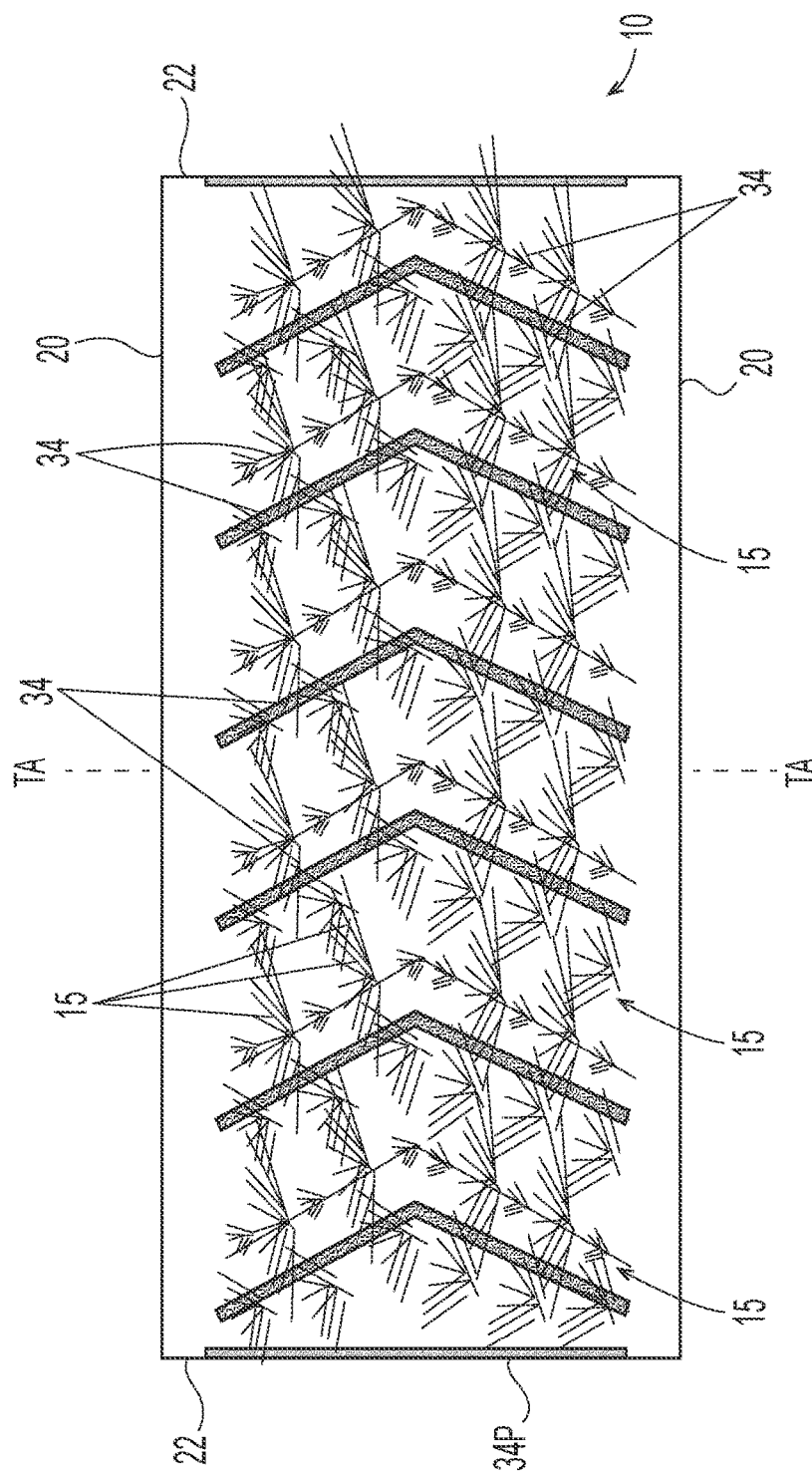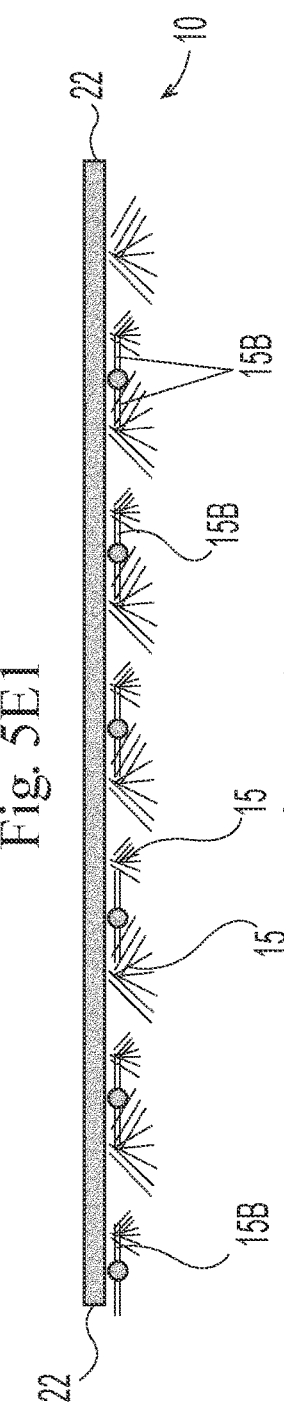
Fig. 5E1
Fig. 5E2

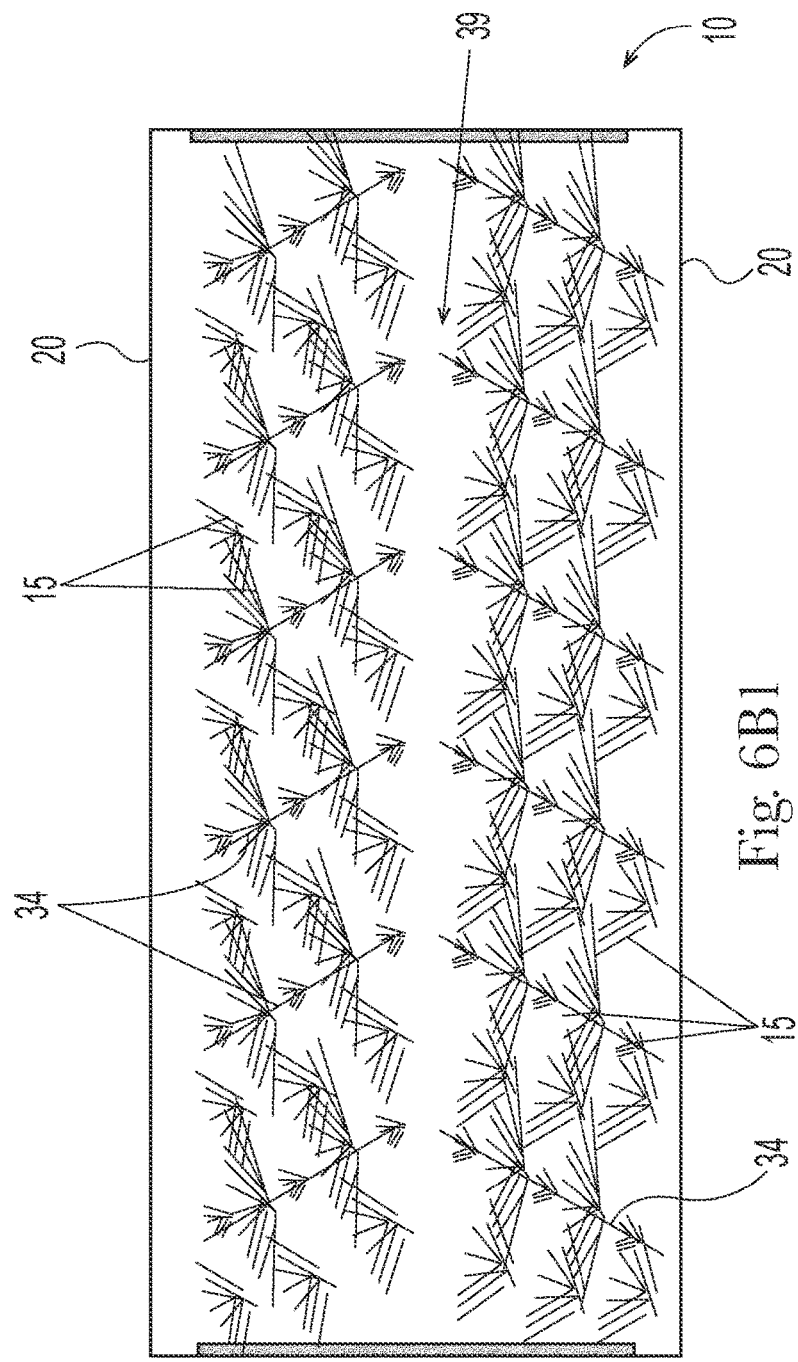
Fig. 6B1
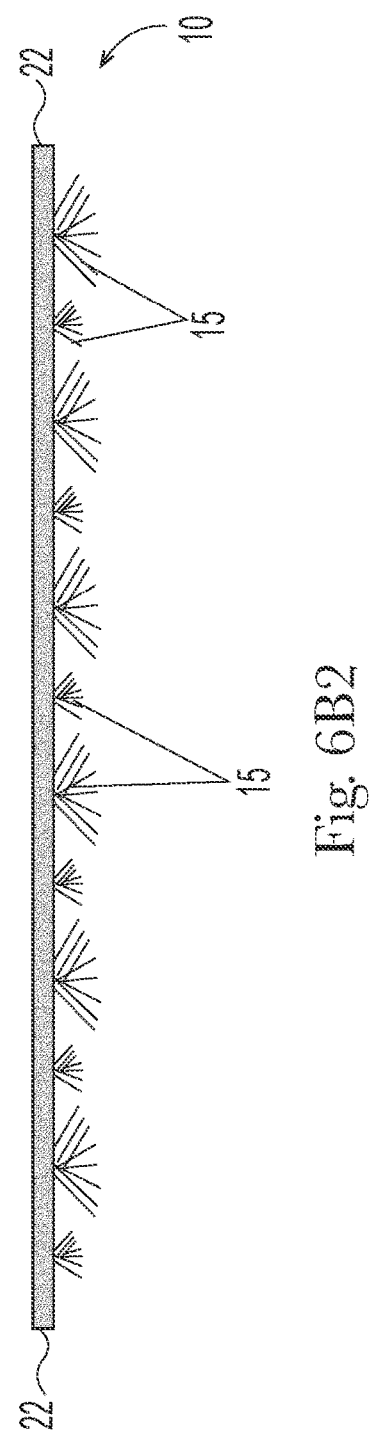
Fig. 6B2

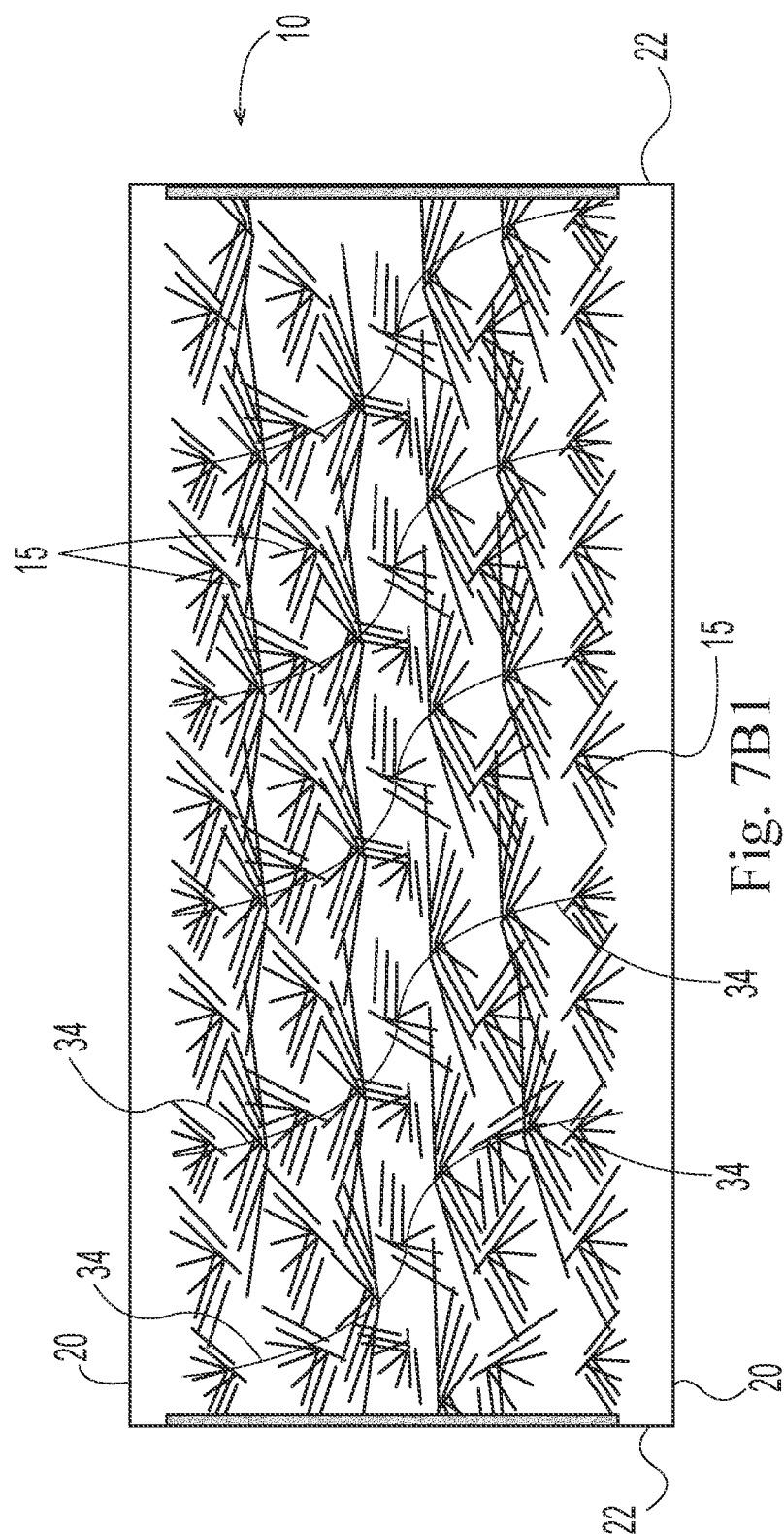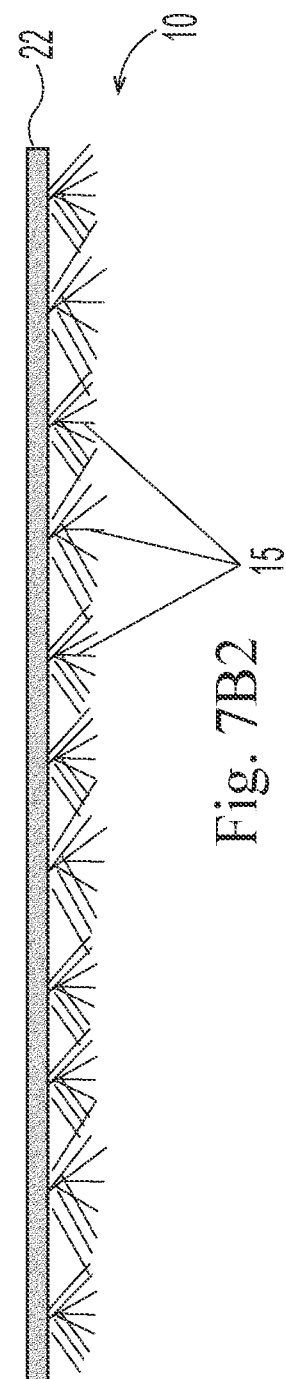

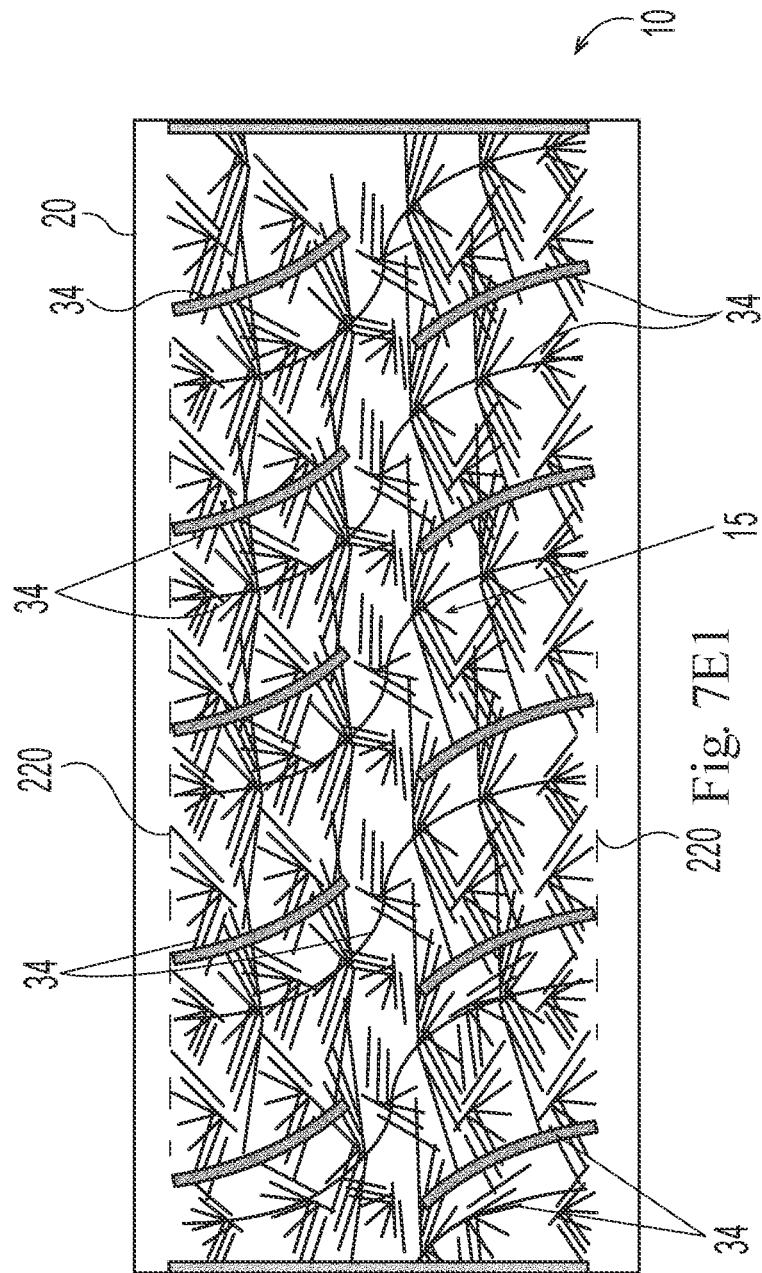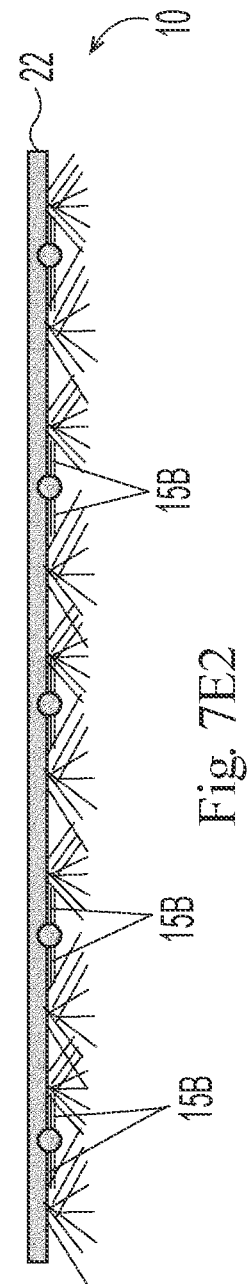

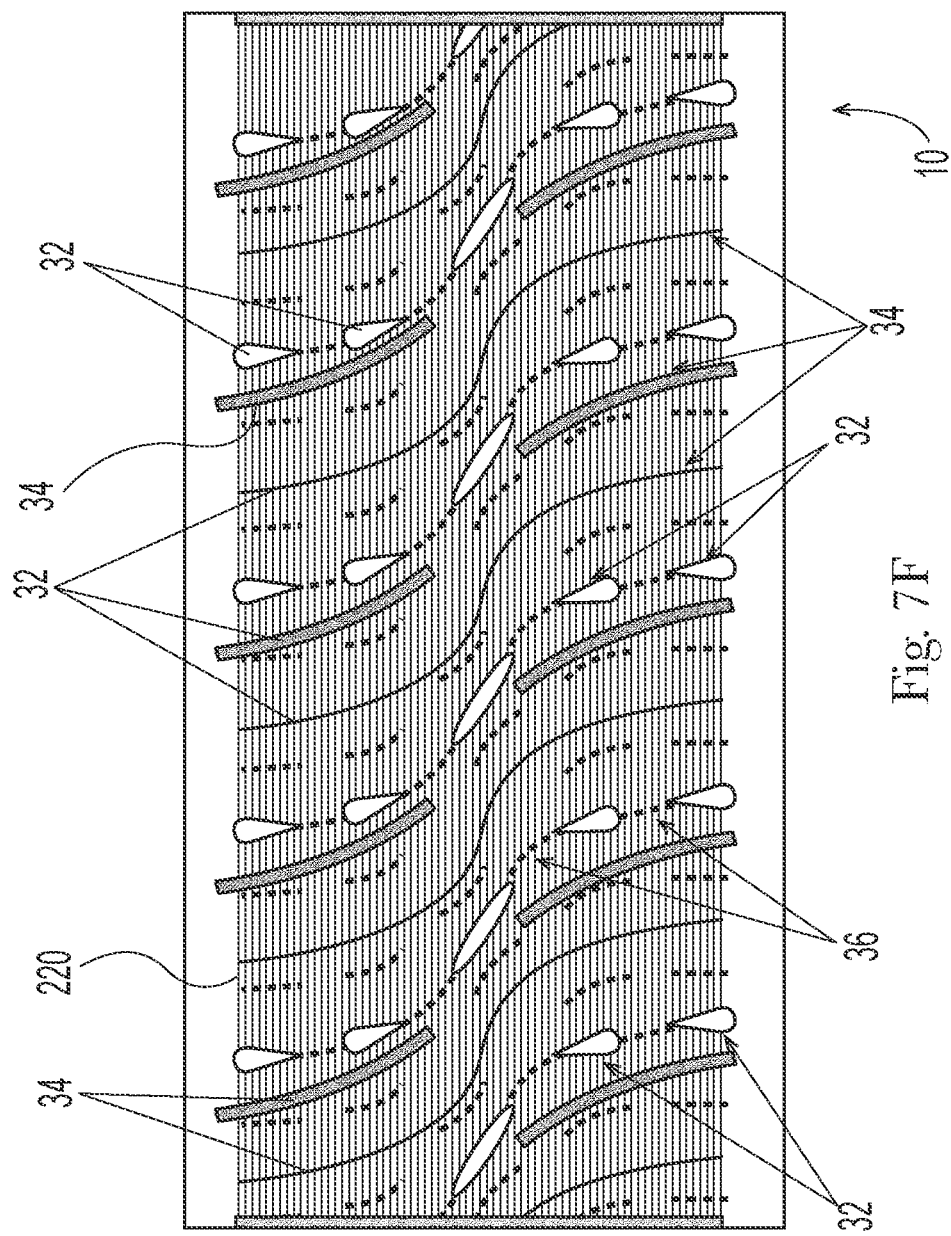

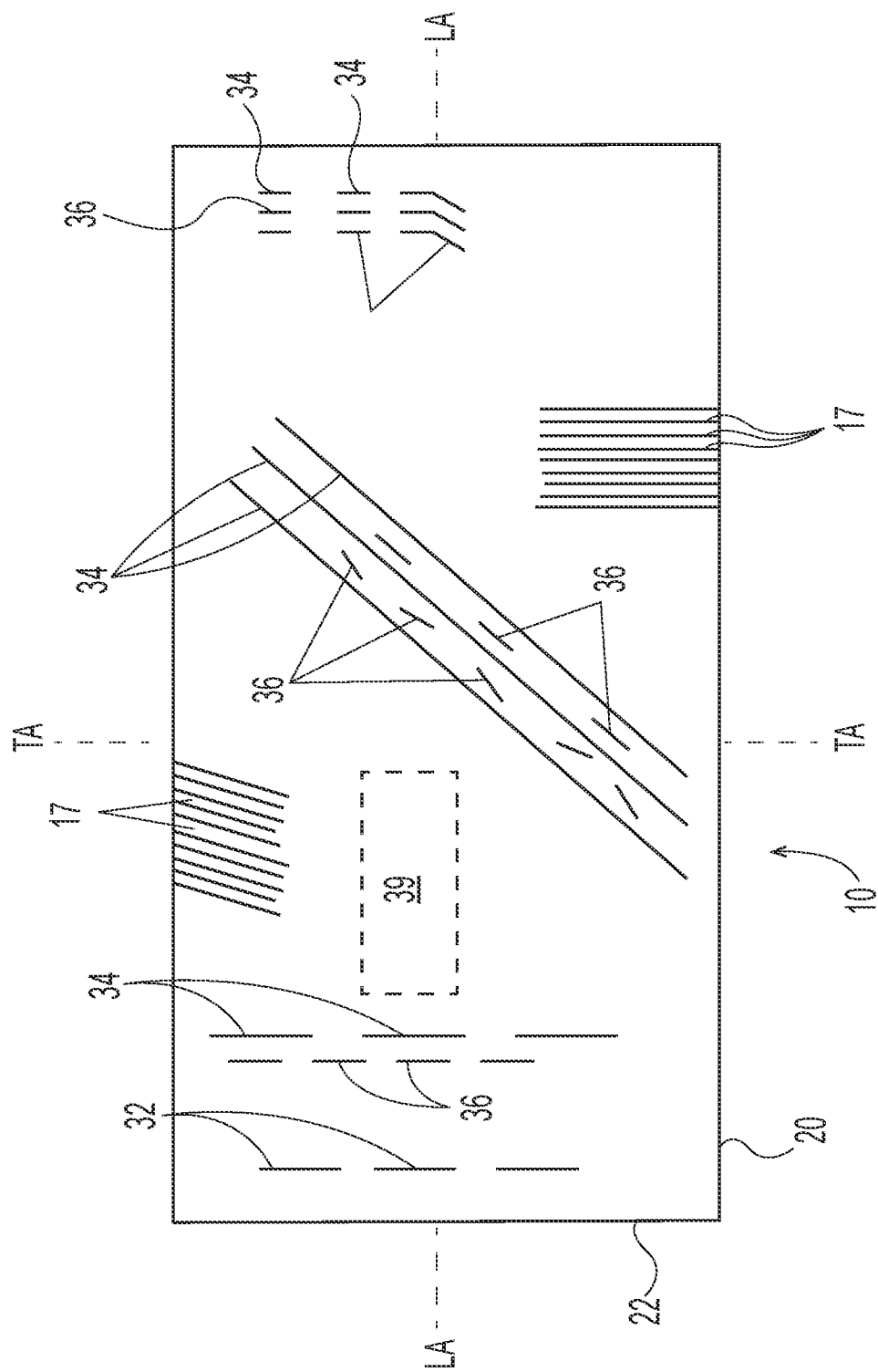

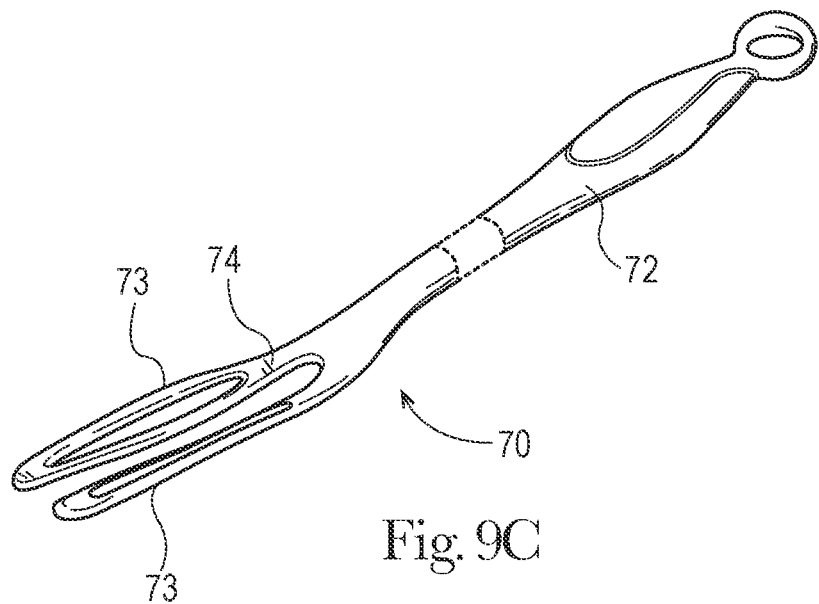
Fig. 9C
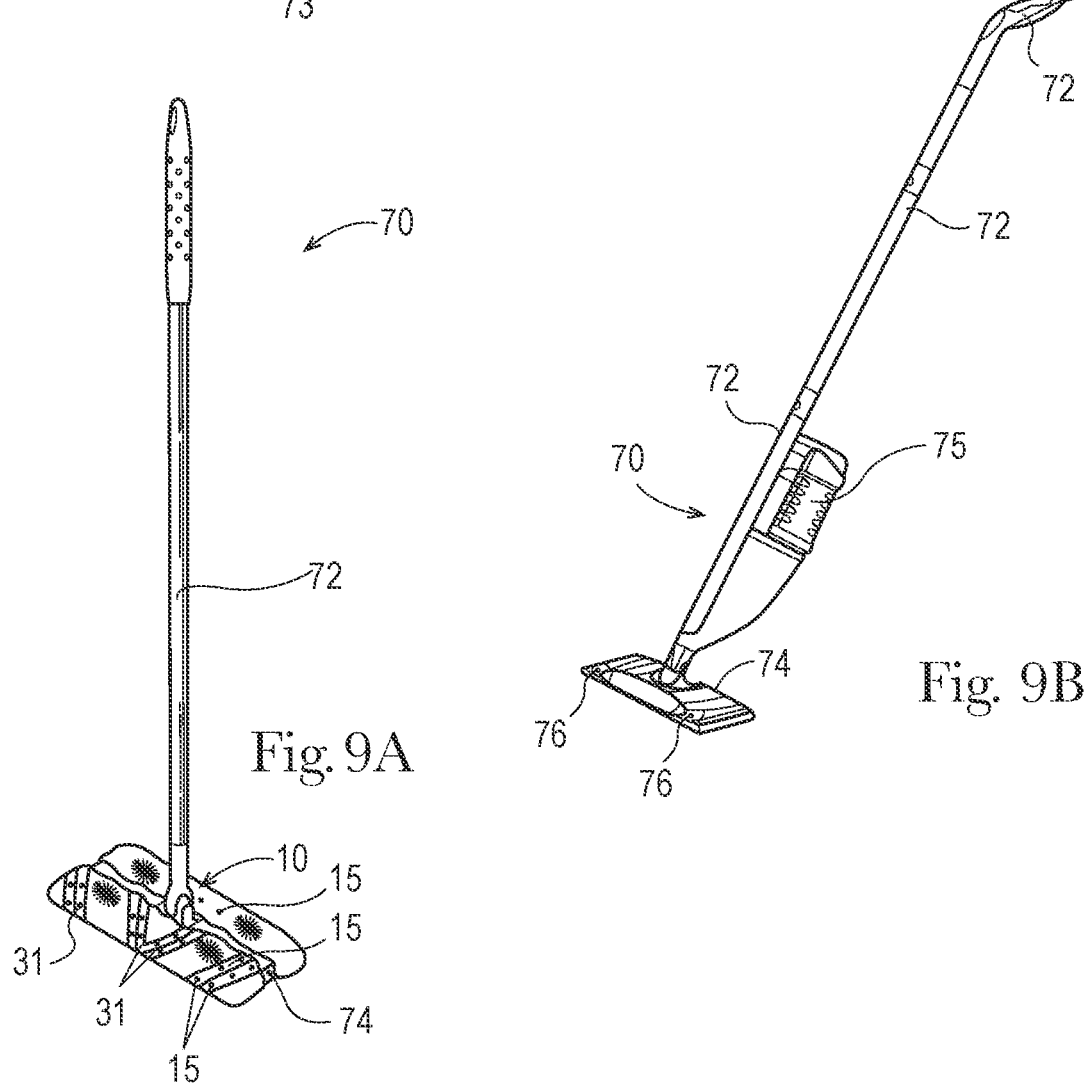
Fig. 9A
Fig. 9B

CLEANING ARTICLE WITH DIFFERENTIAL SIZED TOW TUFTS

FIELD OF THE INVENTION

The present invention relates to cleaning articles having plural sized tufts of tow fibers for cleaning a hard surface.

BACKGROUND OF THE INVENTION

Various cleaning articles have been created for dusting and light cleaning. For example, cloth rags and paper towels used dry or wetted with polishing and cleaning compositions have been used on relatively flat surfaces such as countertops, showers, sinks and floors. Laminiferous wipes have been proposed, as disclosed in U.S. Pat. No. 9,296,176. But, rags, wipes, and paper towels are problematic for reasons such as hygiene (the user's hands may touch chemicals, dirt or the surface during cleaning), reach (it may be difficult to insert the user's hand with the rag, wipe or paper towel into hard-to-reach places) and inconvenience (cleaning between closely-spaced articles typically requires moving the articles).

To overcome the problems associated with using rags and paper towels, various reusable dust gathering devices using felt and hair have been utilized for more than a century, as illustrated by U.S. Pat. No. 823,725 issued in 1906 to Hayden and using yarns as illustrated in U.S. Pat. No. 4,145,787. To address the problems with reusable dust gathering devices, disposable cleaning articles have been developed which have limited re-usability. These disposable cleaning articles may include synthetic fiber tufts, called tow fibers, attached to a sheet as shown in US Application 2006/0171764; U.S. Pat. Nos. 6,143,393; 6,241,835; 6,319,593; 6,329,308; 6,554,937; 6,774,070; 6,813,801; 6,830,801; 6,984,615; 7,003,856; 7,566,671; 7,712,178; 7,779,502; 7,870,635; 7,937,797; 8,146,197; 8,151,402; 8,161,594, 8,186,001; 8,225,453; 8,245,349; 8,646,144; 8,528,151; 8,617,685; 8,646,144; 8,752,232; 8,756,746; 8,763,197; 8,793,832; 9,113,768; 9,198,553 and in commonly assigned U.S. Pat. No. 8,075,977.

Disposable dusters having tow fibers may provide for wet cleaning as disclosed in U.S. Pat. No. 7,566,671 and in commonly assigned U.S. Pat. No. 7,803,726 and commonly assigned US Application 2008/0028560. But tow fibers may become matted when wet and not be suitable for cleaning a large or heavily wetted surface, such as a floor. Thus, dusters may not be suitable for cleaning extremely large or heavily soiled surfaces.

Thus, various sheets have been proposed for cleaning larger target surfaces, such as floors. Webs with elastic behavior have been proposed in commonly assigned U.S. Pat. No. 5,691,035. Sheets with recesses have also been proposed, as disclosed in U.S. Pat. Nos. 6,245,413; and 7,386,907. Sheets with cavities have been proposed, as disclosed in U.S. Pat. No. 6,550,092. An adhesive cleaning sheet is proposed in U.S. Pat. No. 7,291,359. Tufts are taught in commonly assigned U.S. Pat. Nos. 7,682,686, 7,838,099 and/or 8,075,977. Yet other attempts use coatings of wax and/or oil. Coatings, such as wax and oil are generally disclosed in U.S. Pat. Nos. 6,550,092; 6,777,064; 6,797,357; 6,936,330; 6,984,615; 7,386,907; 7,560,398; 7,786,030; 8,536,074; 9,204,775 and 9,339,165. Specific amphiphilic coatings are disclosed in U.S. Pat. No. 8,851,776.

Some of the prior art attempted to focus on debris as simply large and small, based upon the size of the debris intended to be collected. But these teachings do not always address the proper use of tow fibers to collect the range of debris commonly found when cleaning a floor. Prior art attempts to incorporate tow fibers into cleaning sheets did not account for such differences in volume and density. Higher density, granular debris, such as dirt, is not necessarily captured by tow fibers. Tow fibers which are spaced too far apart may not even come in contact with dense, granular debris, much less clean such debris from the surface. And tow fibers which are spaced too closely may not intercept and hold the more voluminous, lower density debris. Even if such debris is initially captured, prior art sheets have not addressed the problem of how to retain such debris by the sheet.

Accordingly, this invention addresses the problem of how to incorporate tow fibers into a hard surface cleaning article for capture and retention of the wide range of debris encountered in everyday cleaning by through the preferential treatment of tow tufts on a cleaning sheet.

SUMMARY OF THE INVENTION

The invention comprises a cleaning article bounded by edges, having a longitudinal axis and comprising a carrier sheet, and a plurality of discretely spaced tufts of tow fibers joined to the carrier sheet. The tufts have secondary bonds therethrough, creating channels for the accumulation of debris.

BRIEF DESCRIPTION OF THE DRAWINGS

In the figures, the bond lines and the footprint of the cleaning article are drawn to scale. The tufts of tow fibers are shown schematically. As used herein, the top view is the view of the cleaning article which faces towards and contacts the target surface. The bottom view is opposed to the top view and faces towards the head of a cleaning device when the cleaning article is attached thereto.

FIG. 1B1 is a top view of the cleaning article of FIG. 1A having discrete tufts represented with a common proximal end for each tuft.

FIG. 1B2 is a side elevational view of the cleaning article of FIG. 1B1.

FIG. 1D is a top view of a cleaning article according to the present invention and having discrete tufts represented as diamonds, with plural width continuous secondary bonds oriented generally parallel to the transverse axis.

FIG. 1E1 is a top view of the cleaning article of FIG. 1D having discrete tufts represented with a common proximal end for each tuft.

FIG. 1E2 is a side elevational view of the cleaning article of FIG. 1E1.

FIG. 2B1 is a top view of the cleaning article of FIG. 2A having discrete tufts represented with a common proximal end for each tuft.

FIG. 2B2 is a side elevational view of the cleaning article of FIG. 2B1.

FIG. 2C is a bottom plan view of the cleaning article of FIGS. 2A, 2B1 and 2B2.

FIG. 2E1 is a top view of the cleaning article of FIG. 2D having discrete tufts represented with a common proximal end for each tuft.

FIG. 2E2 is a side elevational view of the cleaning article of FIG. 2E1.

FIG. 3A is a top view of a cleaning article according to the present invention and having discrete tufts represented as diamonds, with continuous secondary bonds oriented generally diagonal to the transverse axis.

FIG. 3B1 is a top view of the cleaning article of FIG. 3A having discrete tufts represented with a common proximal end for each tuft.

FIG. 3B2 is a side elevational view of the cleaning article of FIG. 3B1.

FIG. 3C is a bottom plan view of the cleaning article of FIGS. 3A, 3B1 and 3B2.

FIG. 3E1 is a top view of the cleaning article of FIG. 3D having discrete tufts represented with a common proximal end for each tuft.

FIG. 3E2 is a side elevational view of the cleaning article of FIG. 3E1.

FIG. 4B1 is a top view of the cleaning article of FIG. 4A having discrete tufts represented with a common proximal end for each tuft.

FIG. 4B2 is a side elevational view of the cleaning article of FIG. 4B1.

FIG. 5B1 is a top view of the cleaning article of FIG. 5A having discrete tufts represented with a common proximal end for each tuft.

FIG. 5B2 is a side elevational view of the cleaning article of FIG. 5B1.

FIG. 5E1 is a top view of the cleaning article of FIG. 5D having discrete tufts represented with a common proximal end for each tuft.

FIG. 5E2 is a side elevational view of the cleaning article of FIG. 5E1.

FIG. 6B1 is a top view of the cleaning article of FIG. 6A having discrete tufts represented with a common proximal end for each tuft.

FIG. 6B2 is a side elevational view of the cleaning article of FIG. 6B1.

FIG. 7B1 is a top view of the cleaning article of FIG. 7A having discrete tufts represented with a common proximal end for each tuft.

FIG. 7B2 is a side elevational view of the cleaning article of FIG. 7B1.

FIG. 7E1 is a top view of the cleaning article of FIG. 7D having discrete tufts represented with a common proximal end for each tuft.

FIG. 7E2 is a side elevational view of the cleaning article of FIG. 7E1

FIG. 7F is a bottom plan view of the cleaning article of FIGS. 7D, 7E1 and 7E2.

FIG. 8 is a bottom plan view of a cleaning article having various combinations of the aforementioned secondary bonds and omitting the optional perimeter bonds.

FIG. 9A is a perspective view of a floor cleaning implement suitable for use with the claimed invention and having a cleaning article attachable thereto.

FIG. 9B is a perspective view of a floor cleaning implement suitable for use with the present invention and which sprays liquid cleanser on the floor.

FIG. 9C is a perspective view of a handle suitable for use with a duster type cleaning article according to the claimed invention.

DETAILED DESCRIPTION OF THE INVENTION

Figure 1A:
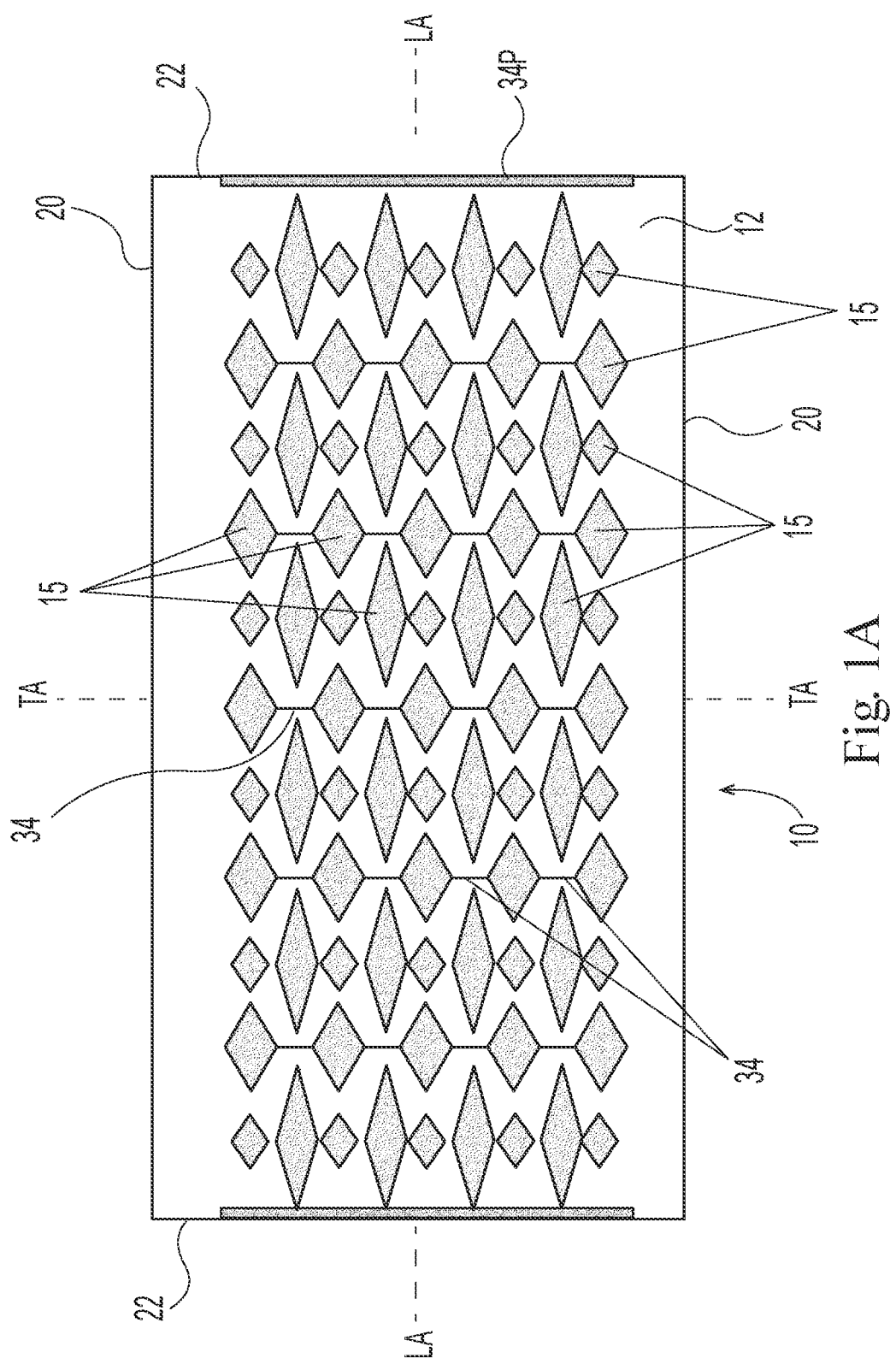
FIG. 1A is a top view of a cleaning article according to the present invention and having discrete tufts represented as diamonds schematically showing three different tuft sizes, with constant width continuous secondary bonds oriented generally parallel to the transverse axis.

Referring generally to FIGS. 1A-8, the cleaning article 10 may be generally elongate, and rectangular, although other shapes are contemplated and feasible. The cleaning article 10 may comprise two or more components joined in a laminate form to provide cleaning article 10 suitable for floor cleaning. The cleaning article 10 may have a carrier sheet, which forms a chassis for attachment of other components thereto. The cleaning article 10 has a plurality of tufts 15 made of tow fibers. The tufts 15 may be disposed in rows 30 forming a grid or field of tufts 15. The tufts 15 are joined to the carrier sheet by a first plurality of primary bonds 32. A second plurality of secondary bonds 34 forms channels or groves through the tufts 15, to provide for accumulation of debris therein.

The cleaning article 10 may be disposable. By disposable it is meant that the cleaning article 10 may be used for one cleaning task, or generally for not more than several square meters, then discarded. In contrast, a reusable cleaning article 10 is laundered or otherwise restored after use. As used herein, the cleaning article 10 according to the present invention, and particularly the carrier sheet thereof is macroscopically planar and defines an XY plane. The tufts 15 extend outwardly in the Z direction perpendicular to the XY plane. The cleaning article 10 may have a longitudinal axis LA defining a longitudinal direction and a transverse axis TA orthogonal thereto and defining a transverse direction, both axes LA, TA lying within the XY plane. The cleaning article 10, and respective components thereof, may have two longitudinal edges 20 parallel to the longitudinal axis LA and two transverse edges 22 parallel to the transverse axis TA. For example, the field of tufts 15 may define a longitudinal edge 220 and transverse edge 222 disposed within the carrier sheet.

The length of the cleaning article 10 is taken in the longitudinal direction. The width of the cleaning article 10 corresponds to the transverse direction perpendicular to the length direction and disposed within the plane of the sheet. The XY plane is defined as the plane defined by the cleaning article 10. The Z-direction of the cleaning article 10 is the direction perpendicular to the plane of the cleaning article 10. The thickness is defined as the dimension in the Z direction. The cleaning article 10 may have a length from 20 to 50 cm and a width of 10 to 30 cm. The cleaning article 10 may particularly be 30+/−2 cm long by 14+/−2 cm wide, as measured at the greatest dimensions, in order to fit the head 74 of a typical cleaning implement 70, as discussed below. Of course, one of skill will recognize that other shapes are feasible and within the scope of the present invention.

The cleaning article 10 may have an outwardly facing cleaning side and an attachment side opposed thereto. The cleaning article 10 is intended to be used dry, although wet cleaning is contemplated and within the scope of the present invention. The cleaning article 10 may also have an optional absorbent core for wet cleaning. An optional core may particularly have a width of 6.5+/−2 cm and a length of 26+/−2 cm.

More particularly, the cleaning article 10 may comprise a construction of at least one tow fiber tuft 15 and at least one carrier sheet. The tow fiber tuft 15 and carrier are joined in face-to-face relationship with at least one permanent bond to form a laminate. The tow fiber tuft(s) 15 may be distended from and extend outwardly from the plane of the carrier sheet to provide a thickness in the z-direction. The tufts 15 may be disposed directly on a carrier sheet. Optionally, the tufts 15 may be bonded to a precursor sheet, which, in turn, is joined to a carrier sheet.

The carrier sheet may particularly comprise a synthetic nonwoven. A carrier sheet having synthetic fibers provides for convenient joining of the tow fibers thereto. Nonwovens include spun bonded, carded and airlaid materials, as are known in the art and made from synthetic fibers. A suitable nonwoven sheet may be made according to commonly assigned U.S. Pat. No. 6,797,357. The carrier sheet may optionally comprise a polyolefinic film, or a microfiber and be liquid pervious or impervious.

The carrier sheet may comprise cellulose, to provide absorptive capacity. A cellulosic sheet may have permanent wet strength resin added thereto, as is known in the art. Or the carrier sheet may preferably comprise a mixture of cellulosic and synthetic fibers, to provide both absorptive and barrier properties.

The carrier sheet may comprise a hydroentangled spunbond nonwoven with a basis weight of 20 to 80 gsm. A 45 gsm nonwoven from Avgol Nonwovens of Tel-Aviv, Israel has been found suitable. The carrier sheet may comprise a laminate of two, three or more plies joined together using adhesive and/or thermal bonds as are known in the art. Optional attachment stripes of loop or similar material may be joined to the attachment side to removably join the cleaning article 10 to a handle 72 or implement 70. One or more plies of the carrier sheet may comprise a microfiber, particularly a nylon microfiber, as is known in the art.

The cleaning article 10 may have an optional cleaning strip element. The cleaning strip element may comprise a polyolefinic film, having integral protrusions as disclosed in commonly assigned U.S. Pat. No. 8,407,848 or may be a rope of tow fibers. The cleaning strip element may preferably comprise a mixture of wet laid fibers formed into a tissue which is bonded onto a synthetic nonwoven using a process such as spun lace or hydroentangling. The cleaning element may particularly comprise a 23 gsm tissue with a 17 gsm polypropylene spunbond as a composite, sold under the name Genesis tissue by Suominen of Helsinki, Finland. Or, the cleaning strip element, precursor sheet and/or the carrier sheet may alternatively or additionally comprise nylon microfiber.

The tow fibers, and tufts 15 formed therewith, may be synthetic, comprising polymers including polyester, polypropylene, polyethylene, bio-derived polymers such as polylactic acid, bio-polyethylene, bio-polyester and the like. Tow fibers may also include fibers from natural sources such as cellulose, cellulose acetate, flax, hemp, jute and mixtures thereof manufactured wherein the individual fibers are relatively long strands manufactured in bundles. Preferred tow fibers are bicomponent fibers having a PP or PE core with a polyethylene sheath. The tow fibers may have a denier per filament of 1.5 to 8.0 and a total crimped denier of 15,000 to 95,000. Tow fibers are a component in Swifter® Dusters™ sold by the instant assignee.

The tow fiber tuft(s) 15 may be joined to the carrier sheet by a plurality of permanent primary bonds 32. The primary bonds 32 are intended to minimize or prevent stray or dislodged tow fibers from becoming loose from the carrier sheet. Such sheets 12 and tow fiber tuft(s) 15 may typically be directly superimposed on one another, with or without intervening sheets, members or components therebetween. The primary bonds 32 may be ultrasonic bonds, adhesive bonds, thermal bonds or a combination thereof, as are known in the art.

The cleaning article 10 also has a secondary plurality of secondary bonds 34. The secondary bonds 34 are formed after the tufts 15 are joined to the carrier sheet by the primary bonds 32. The secondary bonds 34 are generally linear, having an aspect ratio within the XY plane of at least 1, preferably at least 10 and more preferably at least 20. The secondary bonds 34 reduce the thickness of the tufts 15 in the Z direction. The reduced thickness of the secondary bonds 34, relative to the balance of the tufts 15 aligned with the edges of the secondary bonds 34, creates channels to intercept debris. The secondary bonds 34 may be of constant width, or may converge towards a distal end thereof.

The secondary bonds 34 may be of uniform size, orientation relative to the longitudinal axis, and spacing. Alternatively, the secondary bonds 34 may be of variable width, length, spacing, angular orientation and/or geometry, as desired.

The channels formed by the secondary bonds 34 allow large debris to enter in a direction approaching the longitudinal axis LA of the cleaning article 10. Particularly, this arrangement provides the benefit during ordinary use that larger debris can be intercepted in the channel formed by the secondary bond, while smaller debris is intercepted by the tufts 15.

The secondary bonds 34 may have adhesive disposed thereon. The adhesive assists in retention of debris which enters the channels formed by the secondary bonds 34. Suitable adhesive includes contact adhesive. The adhesive may be applied to the secondary bonds 34 by spraying, rollers and other techniques known in the art for zone coating.

The transverse edge 222 of the field of tufts 15 may be juxtaposed with or coincident the transverse edge 22 of the carrier sheet. Preferably a perimeter bond 34P joins the tow fibers of the field of tufts 15 at the respective transverse edges, 22, 222. This arrangement prevents loss of tow fibers from occurring when separating an individual cleaning article 10 from a continuous web or upon a slit 36 being near a transverse edge 22 without an intervening primary bond 32. As used herein, a slit 36 is a cut through the two fibers and underlying carrier sheet, thereby forming a tuft 15.

The cleaning article 10 according to the present invention may be made by providing a carrier sheet. Tow fibers are disposed on the carrier sheet. For the embodiments shown herein, the tow fibers are generally aligned in the longitudinal direction, although the invention is not so limited. The tow fibers are joined to the carrier sheet with transversely offset primary bonds 32. The primary bonds 32 may be elongate. The primary bonds 32 are shown as teardrops, although the invention is not so limited. The primary bonds 32 may be linear or of any desired shape and size, so long as the tow fibers are permanently joined to the carrier sheet thereby.

After the tow fibers are joined to the carrier sheet by the primary bonds 32, the tow fibers are further bonded to the carrier sheet by the secondary bonds 34. Tufts 15 are created by cutting the carrier sheet and tow fibers between the primary bonds 32 with a plurality of elongate slits 36.

The proximal ends of the tow fibers forming a tuft 15 are defined by a respective primary bond 32 or secondary bond 34. Two slits 36 define and form the proximal ends of the tow fibers of a respective tuft 15. Each slit 36 may be disposed between a primary bond 32 and a secondary bond 34. The irregular spacing between the slits 36 produce plural sizes of tufts 15. The tufts 15 nay have a bond 32, 34 defining the proximal end thereof The plural sizes of tufts 15 provide different tuft 15 heights is the Z-direction. The different tuft 15 heights create channels, corresponding to the tufts 15 of lesser height or thickness in the Z direction. These channels unexpectedly improve cleaning performance, as discussed below.

The tufts 15 may be optionally fluffed to increase the thickness of the tufts 15 in the Z direction. Optional fluffing may be accomplished by blowing air, as is known in the art.

After the slits 36 are formed and fluffing, if any, occurs, the secondary bonds 34 are applied. The secondary bonds 34 may be formed in the same manner as the primary bonds 32, or may be formed by different methods. The secondary bonds 34 may be ultrasonic bonds, adhesive bonds, thermal bonds or a combination thereof, as are known in the art. Any such method of forming the secondary bonds 34 is suitable, so long as visually discernable secondary bonds 34 are formed and provide a thickness difference in the Z direction between the secondary bond 34 and at least two or more adjacent tufts 15 of tow fibers.

The slits 36, primary bonds 32 and secondary bonds 34 may be mutually parallel as shown, and including any of the embodiments disclosed herein. This geometry provides the benefit that the spacing therebetween may be tailored to provide the desired tuft 15 sizes.

If three sizes of tufts 15 are selected, as shown in the illustrative and nonlimiting examples described herein, the smallest tufts 15 may have a width of 0.5 to 2 cm, and a thickness of 0.25 to 1 cm. The largest tufts 15 may have a width of 2 to 5 cm, and a thickness of 1 to 3 cm. The intermediate sized tufts 15 may have a width of 1 to 3 cm, and a thickness of 0.5 to 2 cm. The width is taken in the transverse direction and thickness in the Z direction.

The secondary bonds 34 preferably intercept the longitudinal edge 220 of the field of tufts 15. This arrangement allows an opening for large debris to enter the field of tufts 15 in a direction towards the longitudinal axis and be retained by adhesive and/or tufts 15 adjacent to and which form the border of the secondary bond. Without the secondary bonds 34, large debris may become entrapped on the longitudinal edge 220 of the field of tufts 15 and occlude the tufts 15 from intercepting additional debris.

This geometry provides the benefit that when used with a common sized cleaning implement 70, such as the Swifter® Sweeper™ implement 70 sold by the instant assignee, tufts 15 and secondary bonds 34 may wrap the nose of the head 74 of the cleaning implement. Wrapping the nose of the head 74 of the cleaning implement 70 is believed to improve cleaning along walls and baseboards. The amount of tufts 15 on the nose can be controlled by and is inversely proportional to the width of the secondary bonds 34.

Referring particularly to FIGS. 1A-1F, the cleaning article 10 may have secondary bonds 34 which are parallel to the transverse axis TA. This geometry provides the benefit that the secondary bond 34 channels can allow debris to enter generally in the direction of forward and backward motion while, providing sufficient volume to accommodate large amounts of debris.

The secondary bond 34 alignment being parallel to the transverse direction is generally oriented in the cross-machine direction and perpendicular to the machine direction. Thermal bonding and ultrasonic bonding typically occur in the cross-machine direction at any point in time. As the size of the secondary bond 34 increases in the cross-machine direction, the amount of amperage necessary to form the secondary bond 34 likewise increases. Increased amperage typically results in increased equipment cost and resulting increased manufacturing cost. Certain variant embodiments described below are stated to have the advantage of reduced amperage necessary to form the secondary bond 34 relative to the amperage required to form a comparable secondary bond 34 parallel to the transverse direction using thermal bonding and/or ultrasonic bonding.

While generally parallel and equally spaced rows of tufts 15 are shown, the invention is not so limited. Prophetically from two to 15 rows could be used, with equal or unequal spacing and equal or unequal variable widths and equal or unequal tuft 15 density. The rows of tufts 15 may be mutually parallel to the transverse axis, mutually skewed thereto or be mutually skewed relative to other rows. Optionally, adhesive may be disposed in the spaces between the rows 30. The rows 30 may both extend throughout the transverse direction and be interrupted at the longitudinal axis. The tapered intra-tuft spaces between the tufts 15 provide the benefit that no tufts 15 are interrupted by the spaces. Thus all tufts 15 can be selected to be of a size large enough for efficacious cleaning.

The pitch, and thus tuft 15 density, may be constant at any predetermined spacing from the longitudinal edge 20. The tufts 15 may be bilaterally staggered relative to the longitudinal axis and transverse axis. The tufts 15 may fully overlap the position of adjacent tufts 15, in both directions, to provide adequate spacing therebetween and debris retention during back and for the sweeping. Alternatively, each tuft 15 having a maximum diameter, or other maximum dimension taken parallel to the longitudinal axis, and the pitch between adjacent tufts 15 in a particular row may be greater than that maximum diameter/dimension.

The cleaning article according may be tri-folded generally parallel to said longitudinal axis, as is common in the art. This arrangement provides two outboard trisections, commonly used for attachment to the head 74 of a cleaning implement. If desired, tufts 15 may be disposed in at least one of, and optionally both of, the outboard trisections, to provide for cleaning along walls and baseboards.

This geometry provides the benefit that when used with a common sized cleaning implement 70, such as the Swifter® Sweeper™ implement 70 sold by the instant assignee, tufts 15 may wrap the nose of the head 74 of the cleaning implement. Wrapping the nose of the head 74 of the cleaning implement 70 is believed to improve cleaning along walls and baseboards. The amount of tufts 15 on the nose can be controlled by and is inversely proportional to the width of the spaces 31.

The cleaning article may optionally be completely or partially coated with adhesive, wax, Newtonian oils and/or non-Newtonian oils or a combination thereof, in order to improve cleaning and increase retention of absorbed debris. Particularly, the tow fiber tuft 15, in any configuration, may be coated with a mineral oil coating. The coating may comprise a mixture of mineral oil and surfactant at a ratio of about 90% to 10% oil to surfactant. The surfactant provides the benefit inducing the oil to wet the tow fibers by reducing the surface energy. The surfactant may be a non-ionic surfactant.

Referring particularly to FIGS. 1A-1F, the secondary bonds 34 may be continuous. These secondary bonds 34 may intercept both longitudinal edges 220 of the field of tufts 15 to allow convenient entry of debris. While six equally spaced secondary bonds 34 are shown, the invention is not so limited. More or fewer secondary bonds 34 of similar or different size and/or spacing may be utilized.

Each slit 36 may be generally equally spaced in the longitudinal direction between a primary bond 32 and secondary bond 34. The primary bonds 32 and slits 36 may be transversely aligned and longitudinally aligned, as shown. This arrangement provides the benefit that differential spacing between the slits and the bonds 32, 34 adjacent in the transverse direction provide differential tuft 15 size.

Figure 1C:
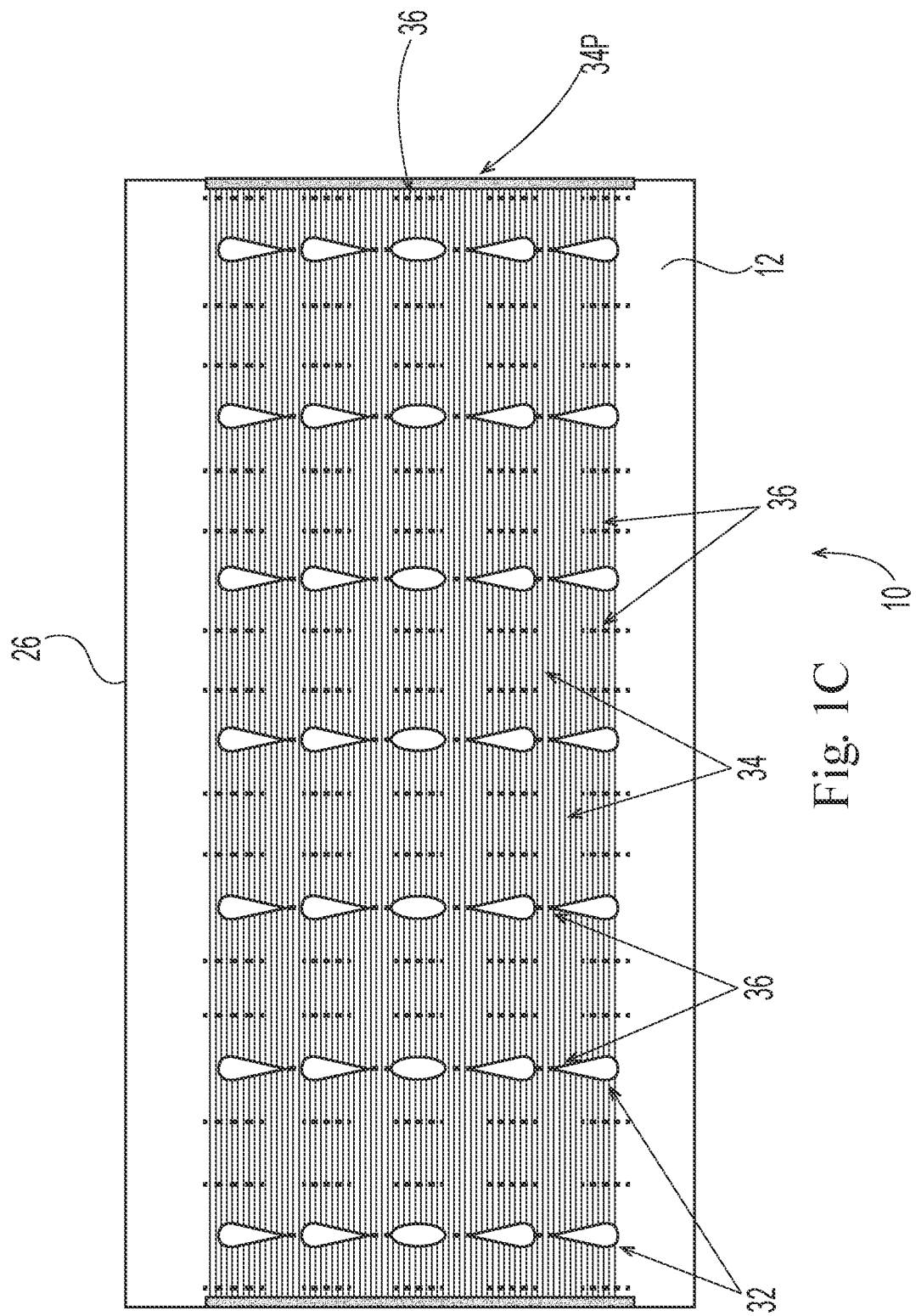
FIG. 1C is a bottom plan view of the cleaning article of FIGS. 1A, 1B1 and 1B2.

Referring to particularly FIGS. 1A-1C, the differential tuft 15 size occurs even though a first plurality of slits 36 is equally spaced between primary bonds 32 and secondary bonds 34. A second plurality of slits 36 is equally spaced between secondary bonds 34. The second plurality of slits 36 may be transversely aligned with the primary bonds, as shown.

Figure 1F:
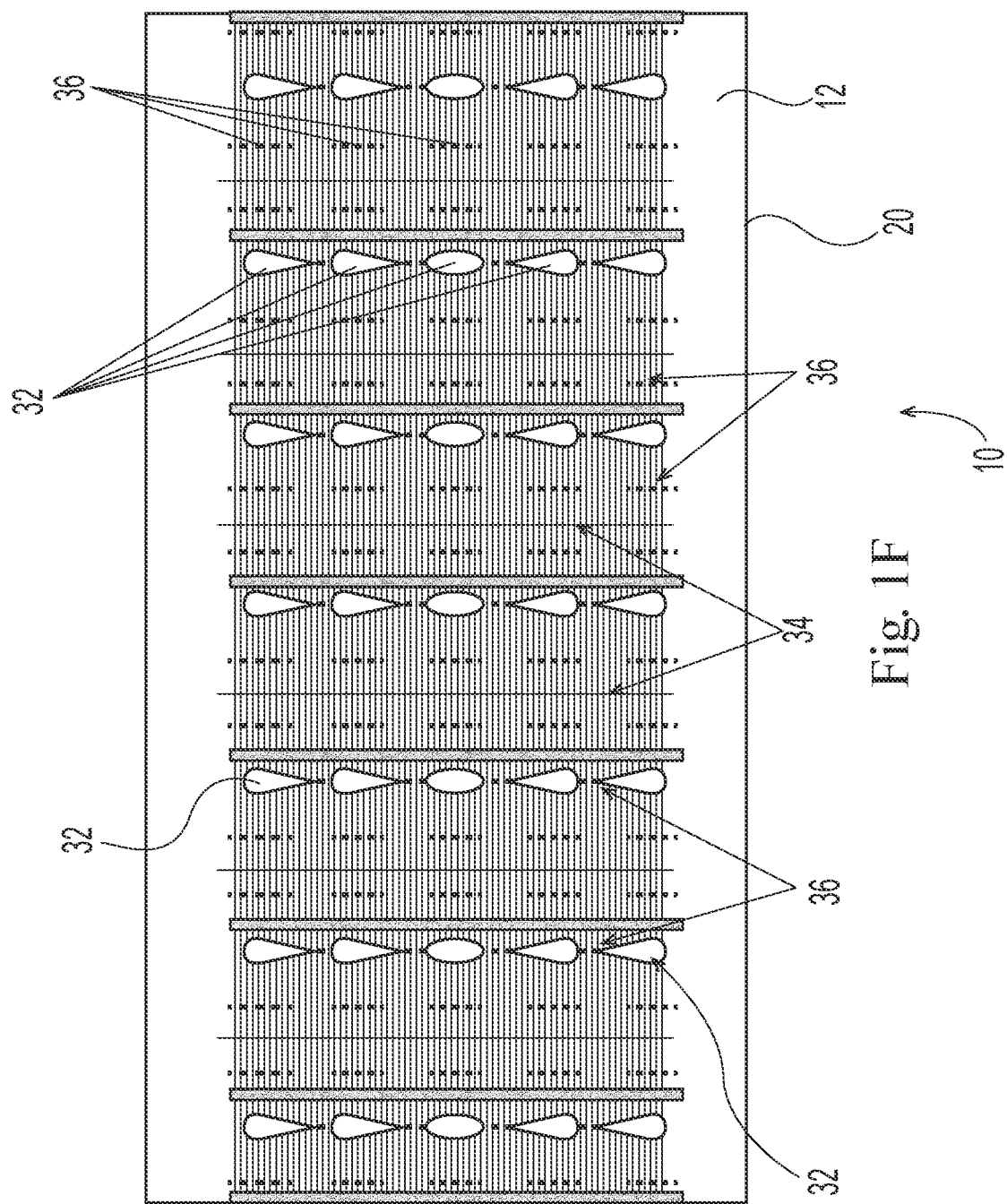
FIG. 1F is a bottom plan view of the cleaning article of FIGS. 1D and 1E.

Referring particularly to FIGS. 1D-1F, the secondary bonds 34 may be of plural widths, to provide variable width in the channels formed by the bonds, and thereby increase debris retention. The secondary bonds 34 may be bulbous, tapered, or constant width as shown.

The slits 36 may be unequally transversely spaced from a primary bond 32 and secondary bond 34. This geometry allows one of skill to tailor the sizes of the tufts 15 to the desired end use.

Referring particularly to FIGS. 2A-2F, the cleaning article 10 may have interrupted secondary bonds 34 which are parallel to the transverse axis TA. These secondary bonds 34 may also intercept both longitudinal edges 220 of the field of tufts 15 to allow convenient entry of debris.

This geometry provides the benefit that the secondary bond 34 channels can allow debris to enter generally in the direction of forward and backward motion while having no tufts 15 on or proximate to the longitudinal axis LA. Having a longitudinal axis LA free of tufts 15 provides additional freedom of movement of interior tufts 15, prophetically improving debris pickup.

Furthermore, the interior channel, coincident and/or proximate the longitudinal axis LA may be provided with a tacky coating 39 to improve retention of debris. For example a wax, such as microcrystalline wax or adhesive may be disposed on or proximate the longitudinal axis LA. The tacky coating 39 may be disposed in a range of 2.5 to 10 gsm and more particularly 3 to 3.5 gsm.

Figure 2A:
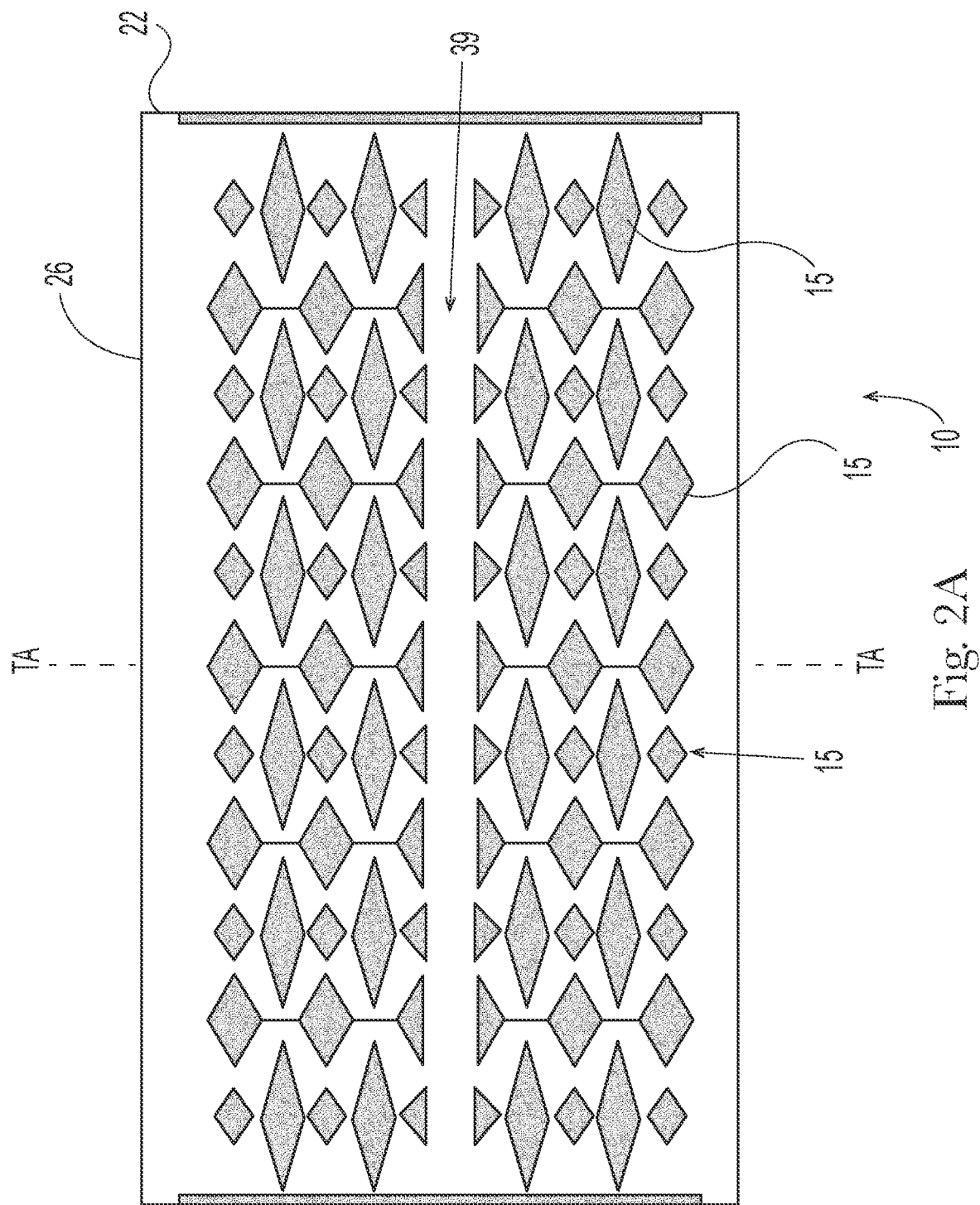
FIG. 2A is a top view of a cleaning article according to the present invention and having discrete tufts represented as diamonds, with interrupted constant width secondary bonds oriented generally parallel to the transverse axis.
Figure 2D:
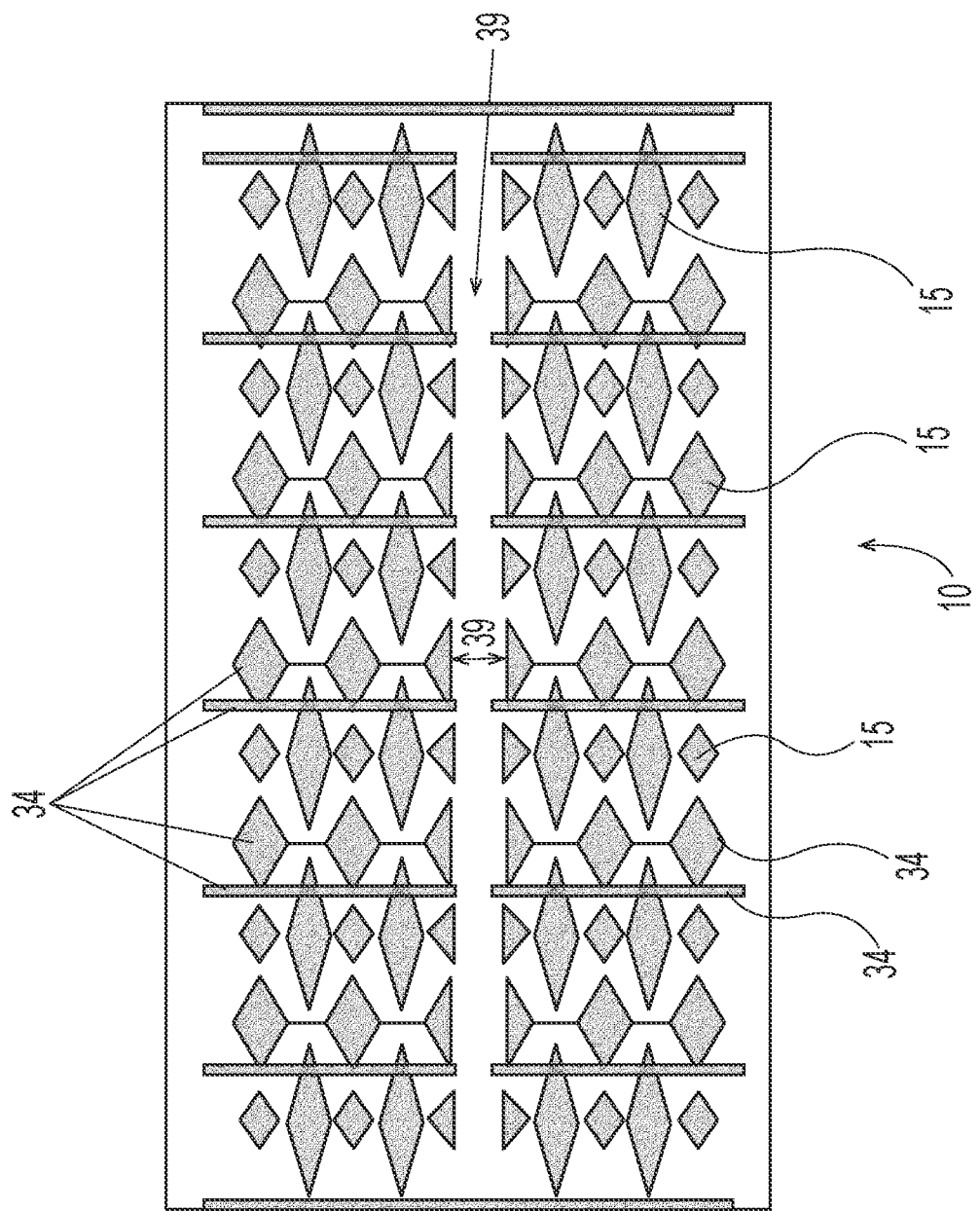
FIG. 2D is a top view of a cleaning article according to the present invention and having discrete tufts represented as diamonds, with interrupted plural width secondary bonds oriented generally parallel to the transverse axis.
Figure 2F:
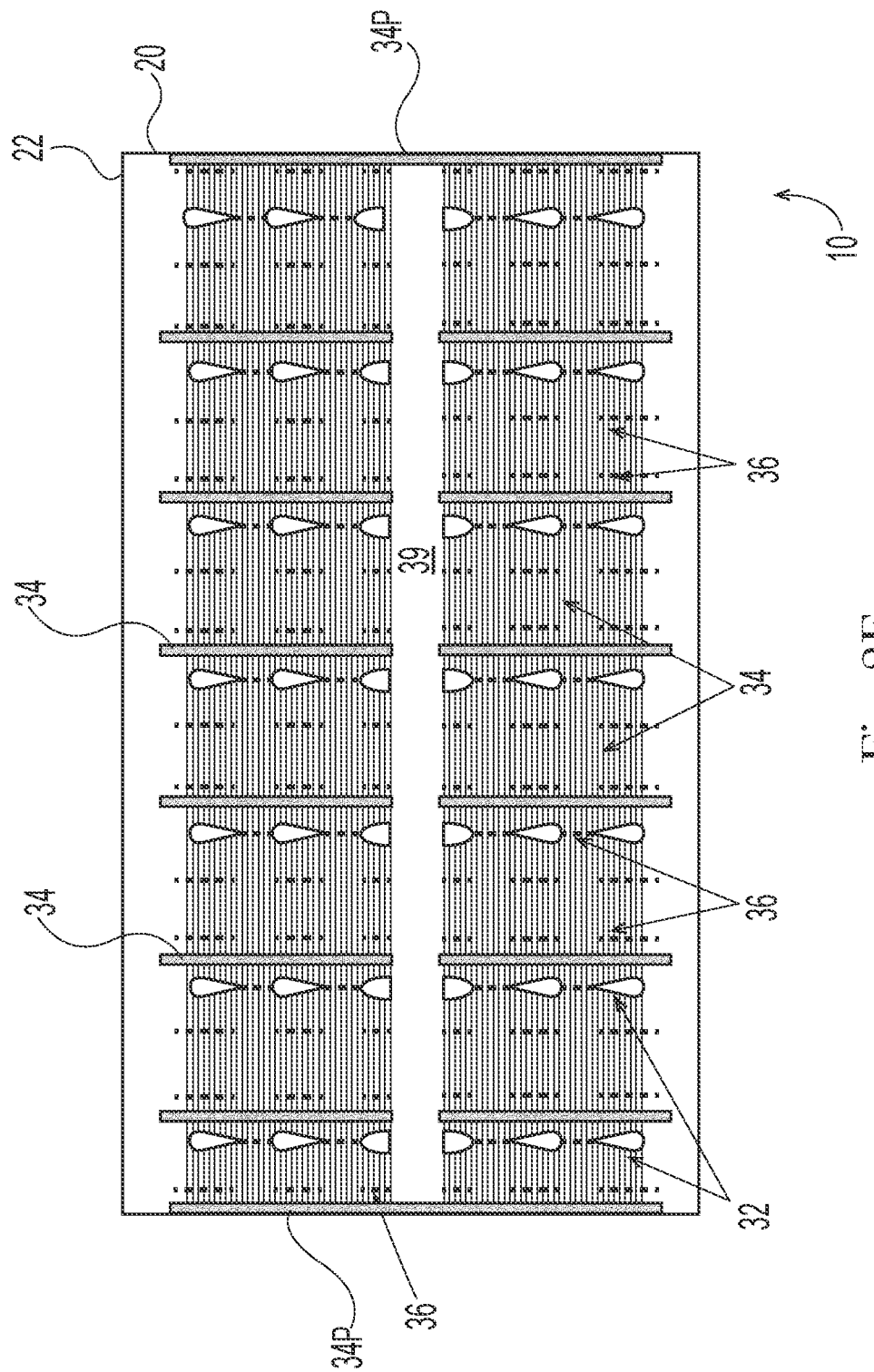
FIG. 2F is a bottom plan view of the cleaning article of FIGS. 2D and 2E.

Referring to FIGS. 2A-2C, the regularly spaced bonds 32, 34 provide the benefits described above with respect to FIGS. 1A-1C. Referring to FIGS. 2D-2F, the irregularly spaced bonds 32, 34 provide the benefits described above with respect to FIGS. 1D-1F. While 12 equally spaced secondary bonds 34 are shown, the invention is not so limited. More or fewer secondary bonds 34 of similar or different size and/or spacing may be utilized.

Referring to FIGS. 3A-3F, the secondary bonds 34 may be diagonally oriented relative to the longitudinal axis LA. The diagonal orientation, for all such embodiments described and claimed herein, provides the benefit that during back and forth motion debris entering the channels formed by the secondary bonds 34 can intercept a tuft 15 bordering the channel and be retained thereby. Further, the channels can intercept debris during turns and lateral motions which occur during cleaning.

Furthermore, for all diagonal secondary bond 34 embodiments described and claimed herein, the instantaneous amperage draw of the bonding step during manufacture, is reduced compared to a secondary bond 34 oriented in the transverse direction during ultrasonic bonding or thermal bonding. The reduction in amperage occurs due to less bond area being present at any point in time.

Referring to FIGS. 3A-3C, the secondary bonds 34 may be continuous and form an angle with the longitudinal axis LA of 30 to 75 degrees. These secondary bonds 34 may intercept both longitudinal edges 220 of the field of tufts 15 to allow convenient entry of debris.

Figure 3D:
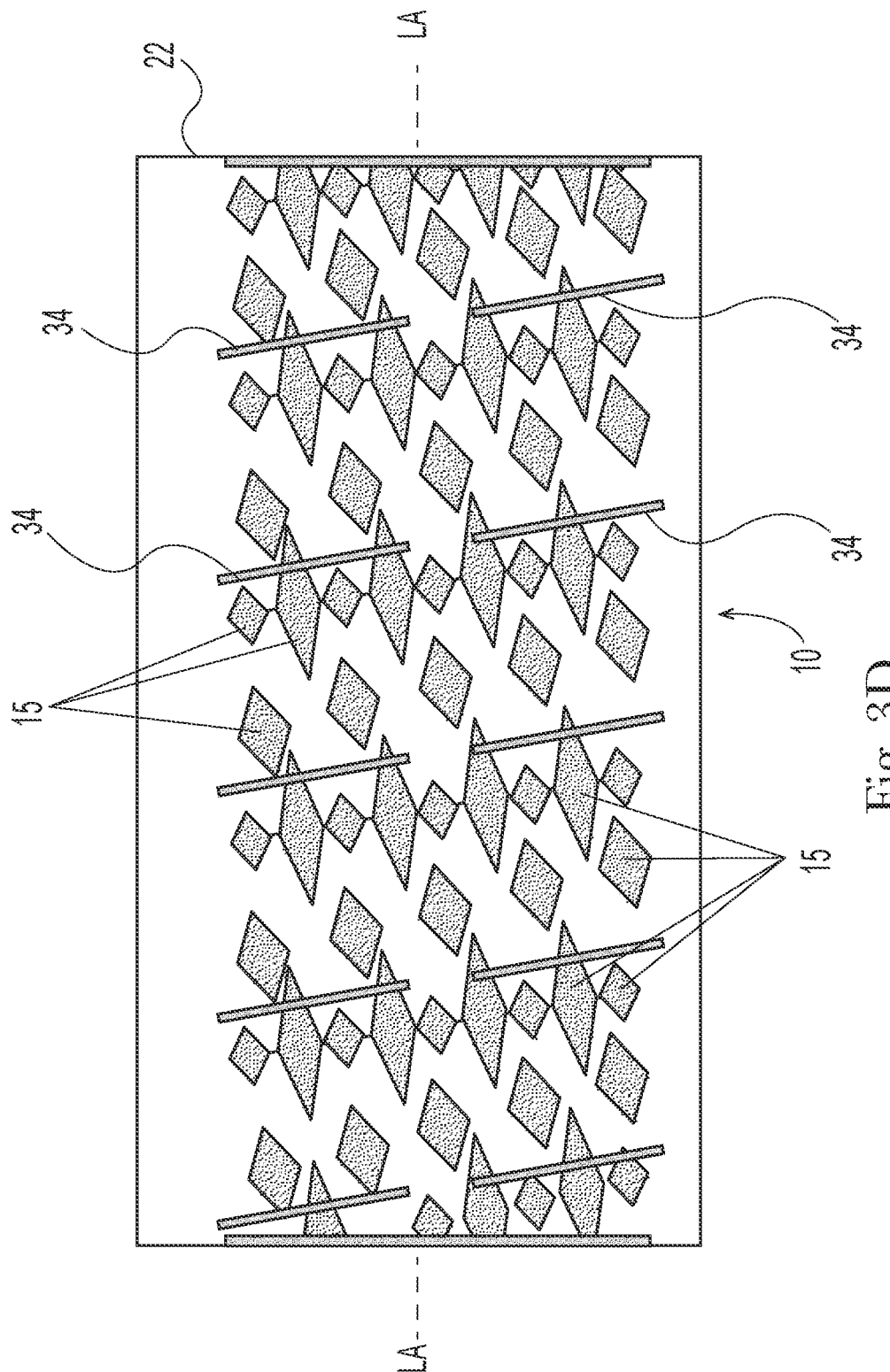
FIG. 3D is a top view of a cleaning article according to the present invention and having discrete tufts represented as diamonds, with interrupted secondary bonds oriented generally diagonal to the transverse axis.
Figure 3F:
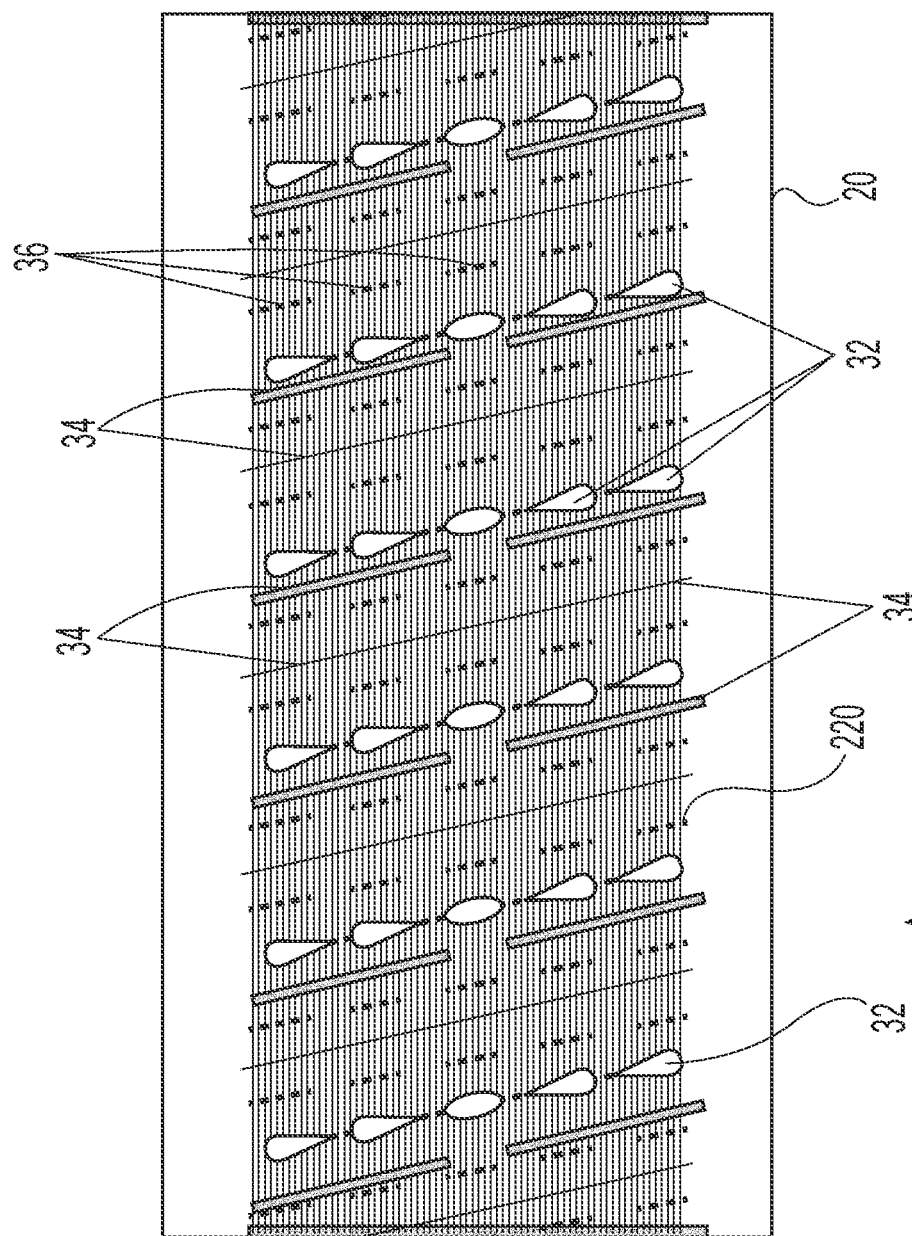
FIG. 3F is a bottom plan view of the cleaning article of FIGS. 3D, 3E1 and 3E2.

Referring to FIGS. 3D-3F, the diagonally oriented secondary bonds 34 may be interrupted proximate the longitudinal axis LA. Again, this embodiment provides the benefit of tufts 15 on the longitudinal axis for retention of debris and diagonal bonds to reduce the instantaneous amperage required during manufacture. The secondary bonds 34 may be offset from other secondary bonds 34 in the diagonal direction. This arrangement provides the benefit that placement of the secondary bonds 34 may be customized to the intended cleaning task.

Referring to FIGS. 3A-3C, the regularly spaced bonds 32, 34 provide the benefits described above with respect to FIGS. 1A-1C. Referring to FIGS. 3D-3F, the irregularly spaced bonds 32, 34 provide the benefits described above with respect to FIGS. 1D-1F.

Figure 4A:
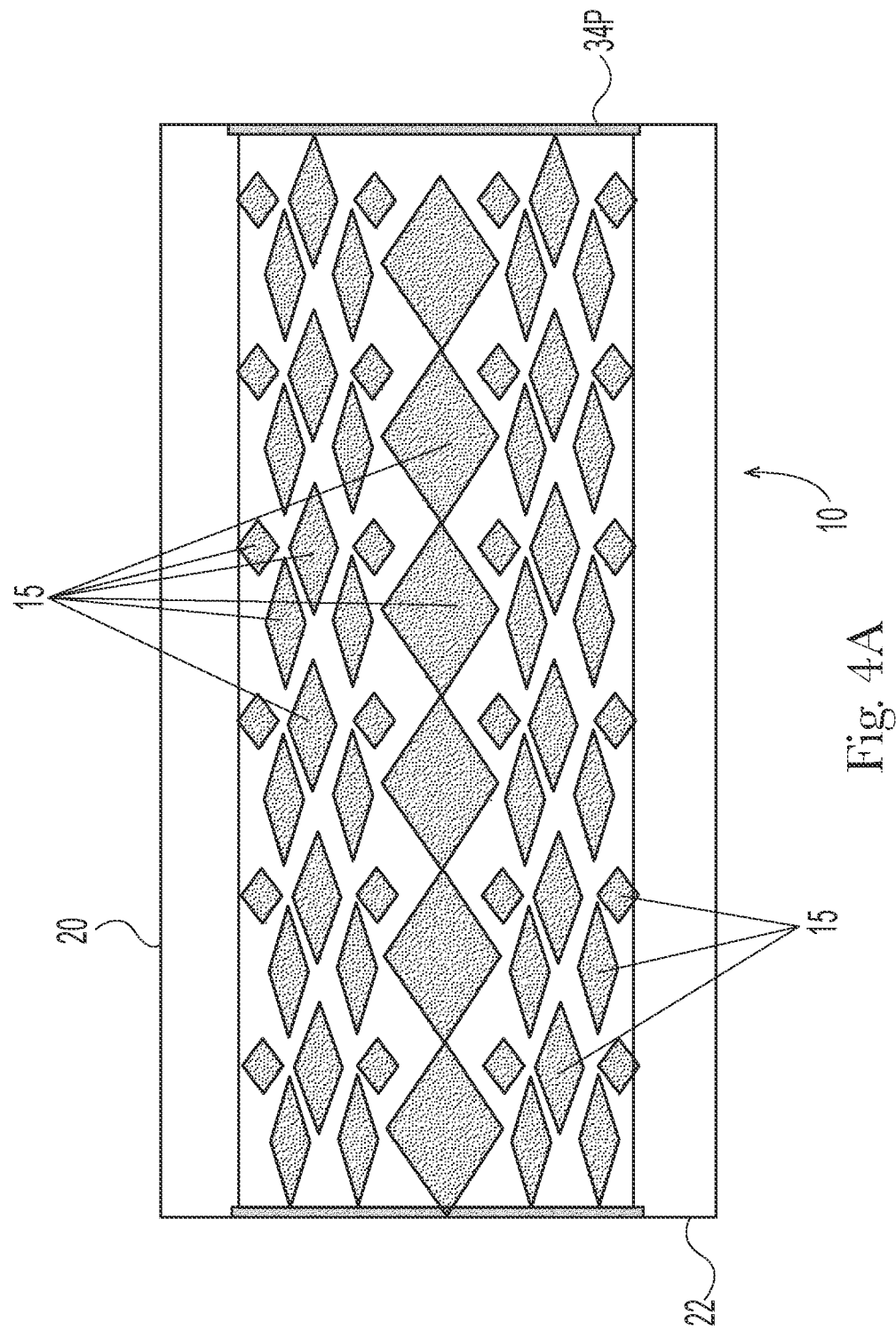
FIG. 4A is a top view of a cleaning article according to the present invention and having discrete tufts represented as diamonds, with uniformly spaced secondary bonds oriented generally parallel to the transverse axis and intermittently spaced slits.
Figure 4C:
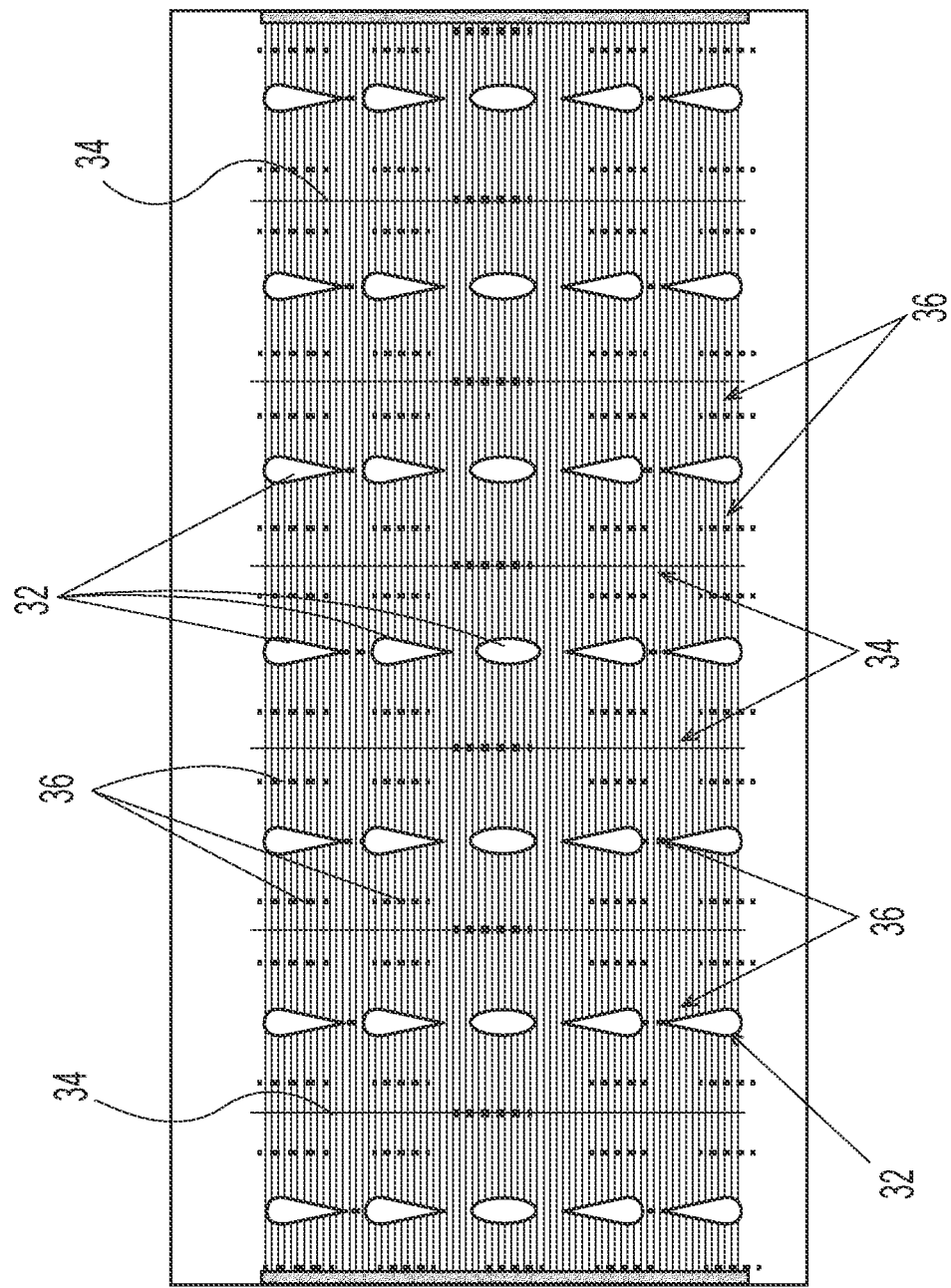
FIG. 4C is a bottom plan view of the cleaning article of FIGS. 4A, 4B1 and 4B2.

Referring to FIGS. 4A-4C, the cleaning article may have plural sizes of primary bonds 32, as measured in the transverse direction. This arrangement provides more flexibility to create a like plurality of tuft 15 sizes, including tufts 15 having a greater transverse dimension creating more thickness in the Z direction. Likewise, the elongate slits 36 aligned with the primary bonds 32 in the longitudinal direction, may have a length complementary to or identical to the length of adjacent primary bonds 32.

Placing the larger tufts 15 on the longitudinal axis LA, as shown, provides the prophetic benefit that the greater Z direction thickness proximate the longitudinal axis can reduce snowplowing of debris at the leading edge of the cleaning article during ordinary use.

Figure 5A:
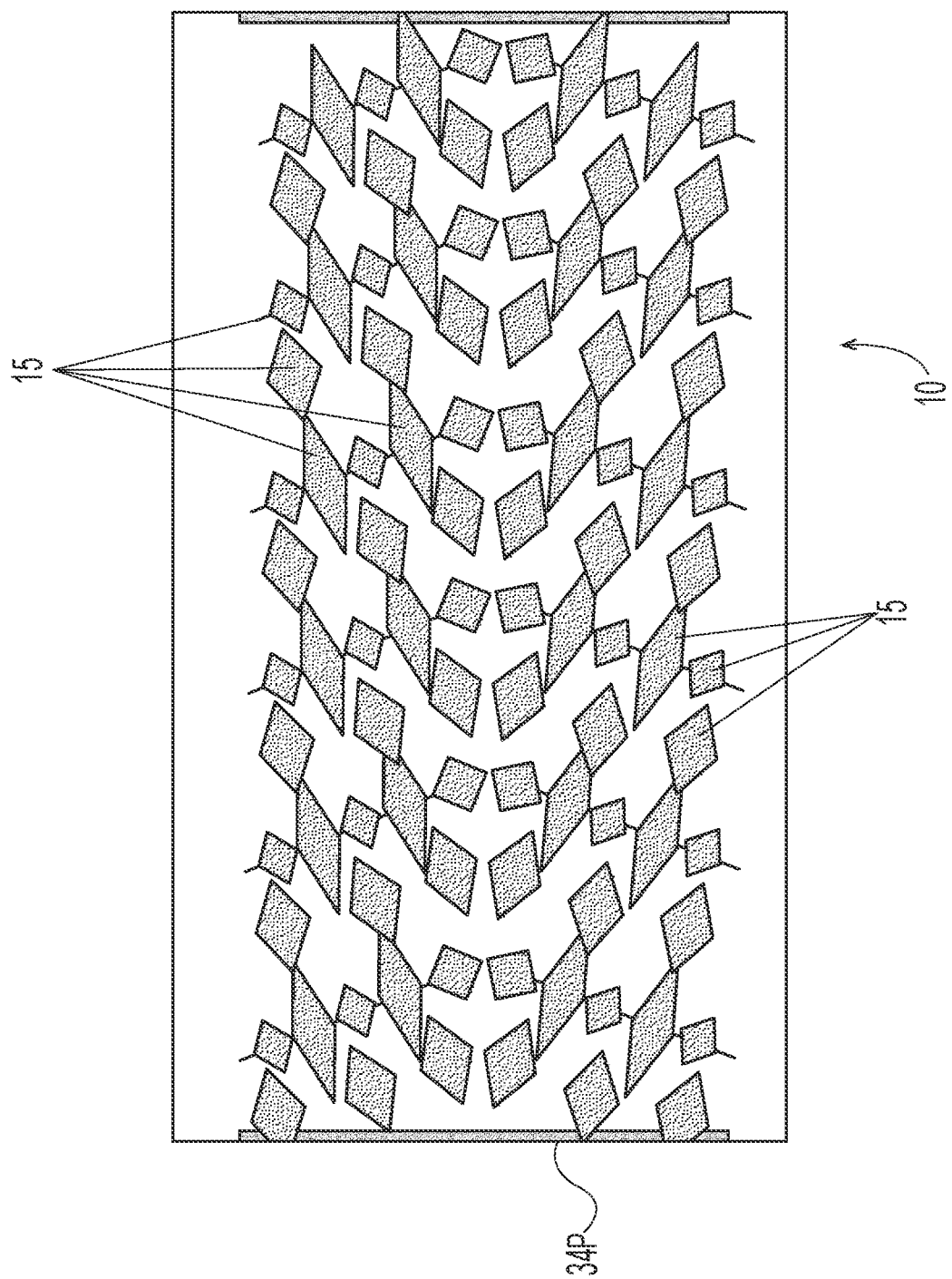
FIG. 5A is a top view of a cleaning article according to the present invention and having discrete tufts represented as diamonds, with continuous chevron shaped secondary bonds.
Figure 5C:
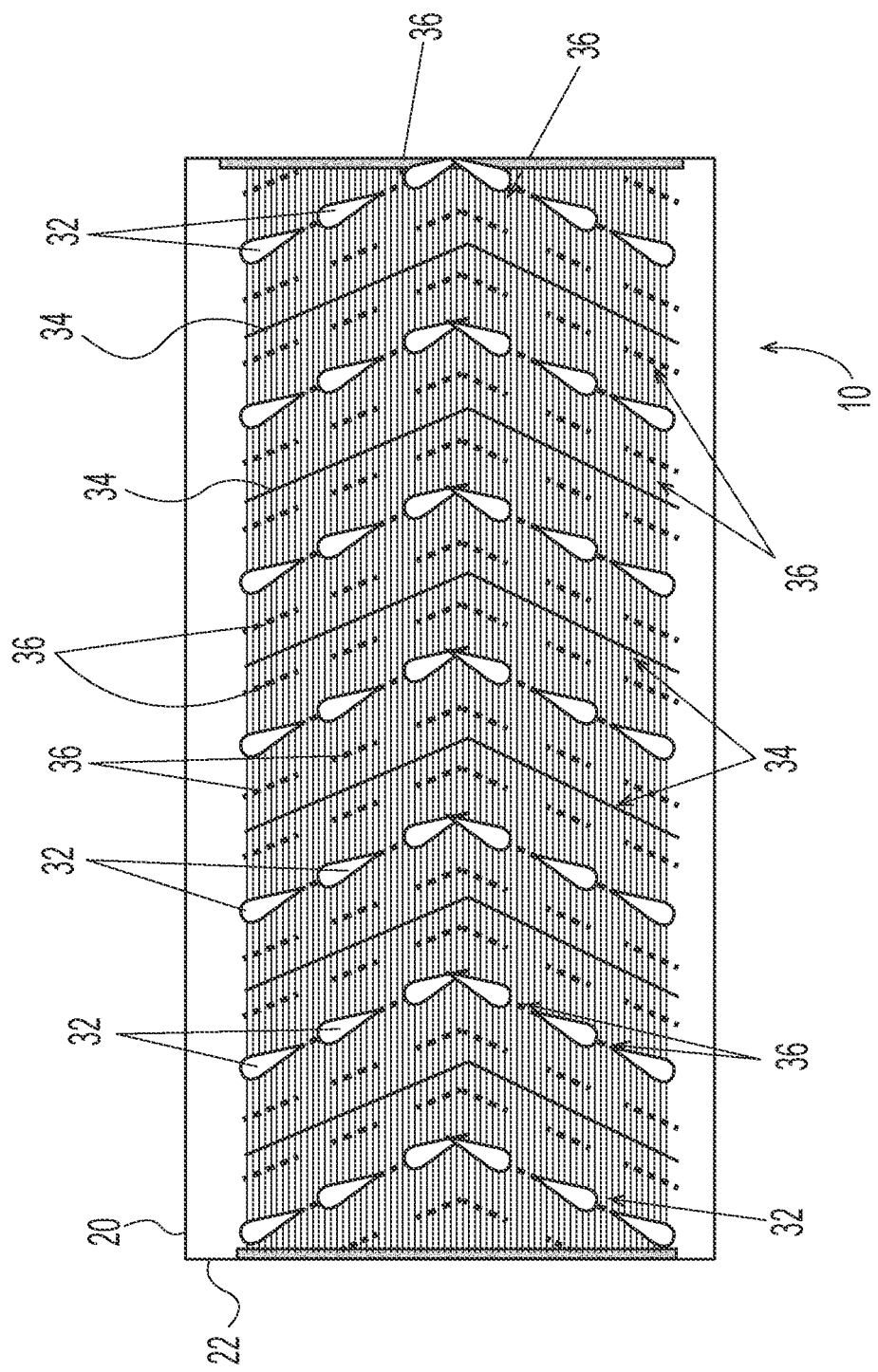
FIG. 5C is a bottom plan view of the cleaning article of FIGS. 5A, 5B1 and 5B2.
Figure 5D:
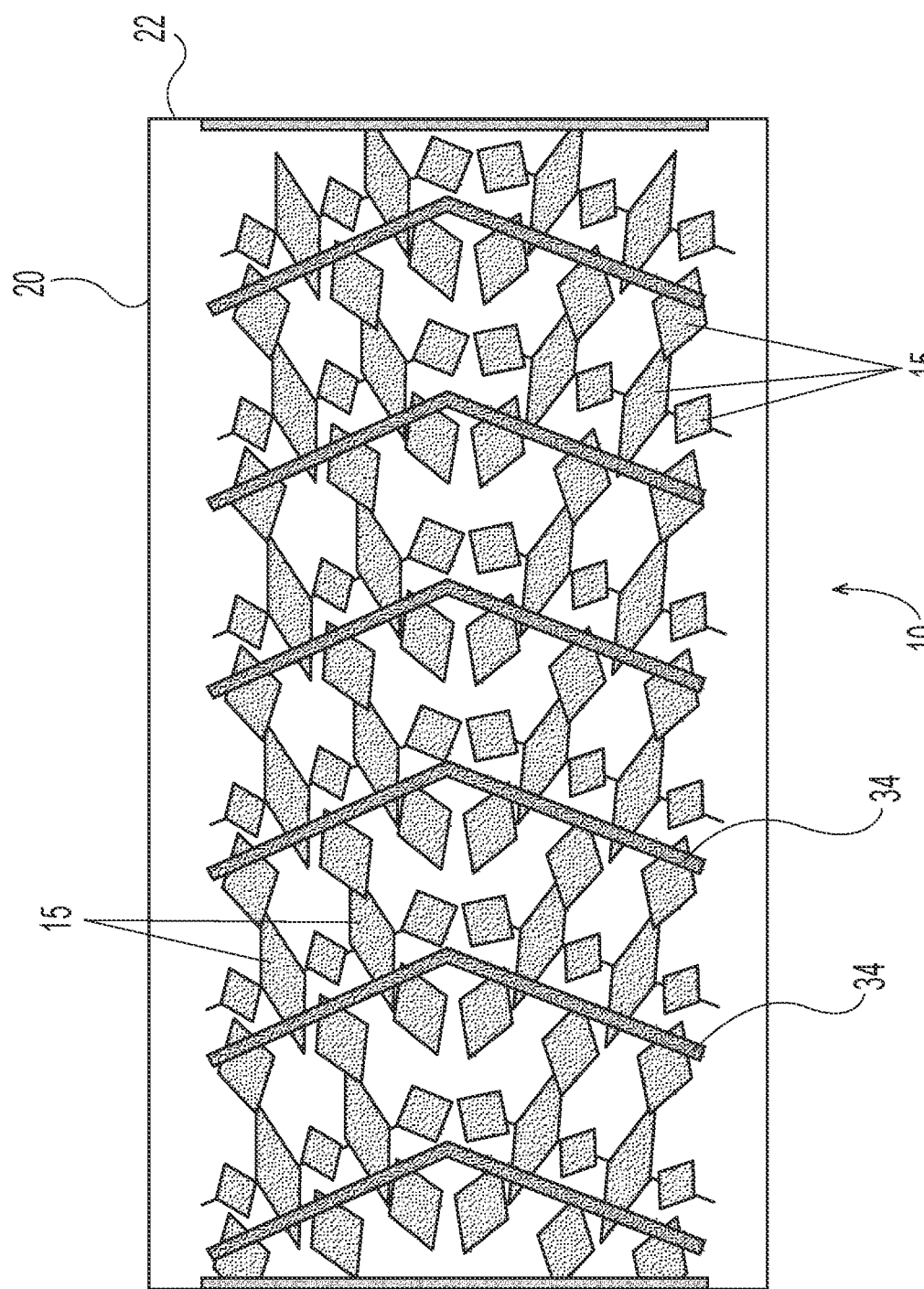
FIG. 5D is a top view of a cleaning article according to the present invention and having discrete tufts represented as diamonds, with plural width continuous chevron shaped secondary bonds.
Figure 5F:
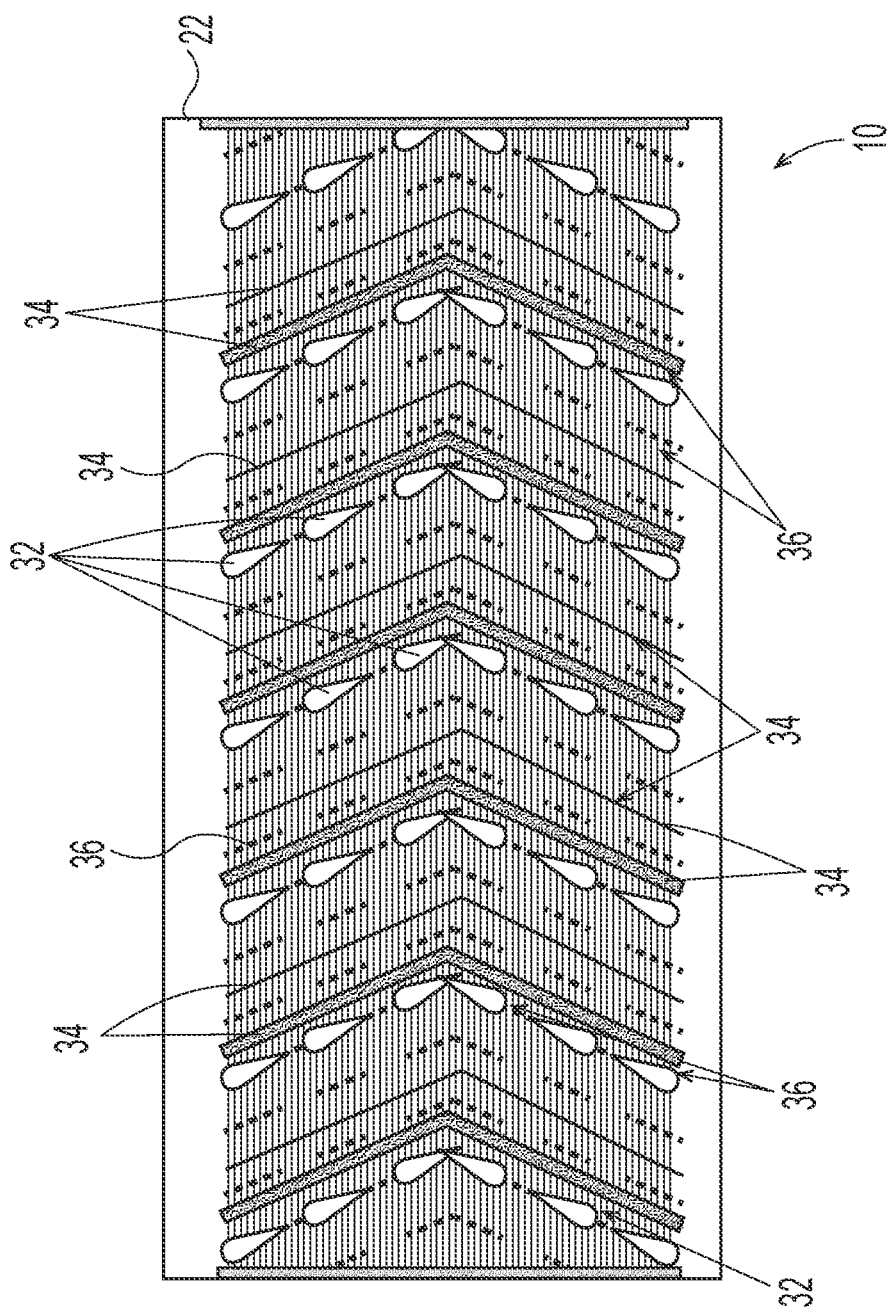
FIG. 5F is a bottom plan view of the cleaning article of FIGS. 5D, 5E1 and 5E2.

Referring to FIGS. 5A-5C, the secondary bonds 34 may be continuous chevrons, bridging across the longitudinal axis LA. Chevrons provide the benefit of reduced instantaneous amperage requirements for thermal bonding and ultrasonic bonding of the secondary bonds 34. The diagonal legs of the chevron each provide for retention of debris in the channels of the secondary bonds 34. The chevrons advantageously provide for diagonally oriented channels in two different directions. The two different orientations provide the benefit of intercepting dirt in different directions as the cleaning motion occurs in various directions.

Figure 6A:
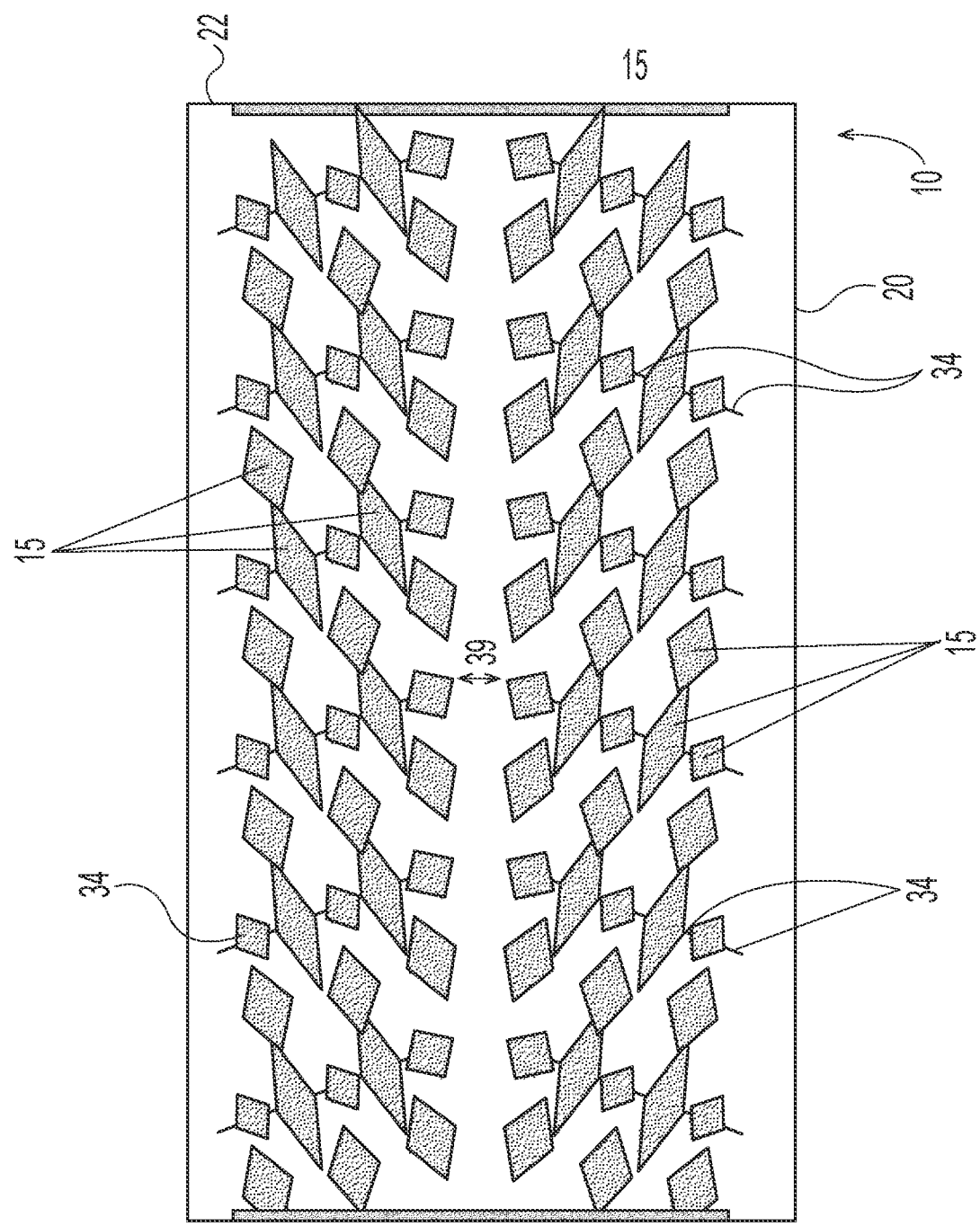
FIG. 6A is a top view of a cleaning article according to the present invention and having discrete tufts represented as diamonds, with interrupted chevron secondary bonds, forming herring bones oriented in the longitudinal direction.
Figure 6C:
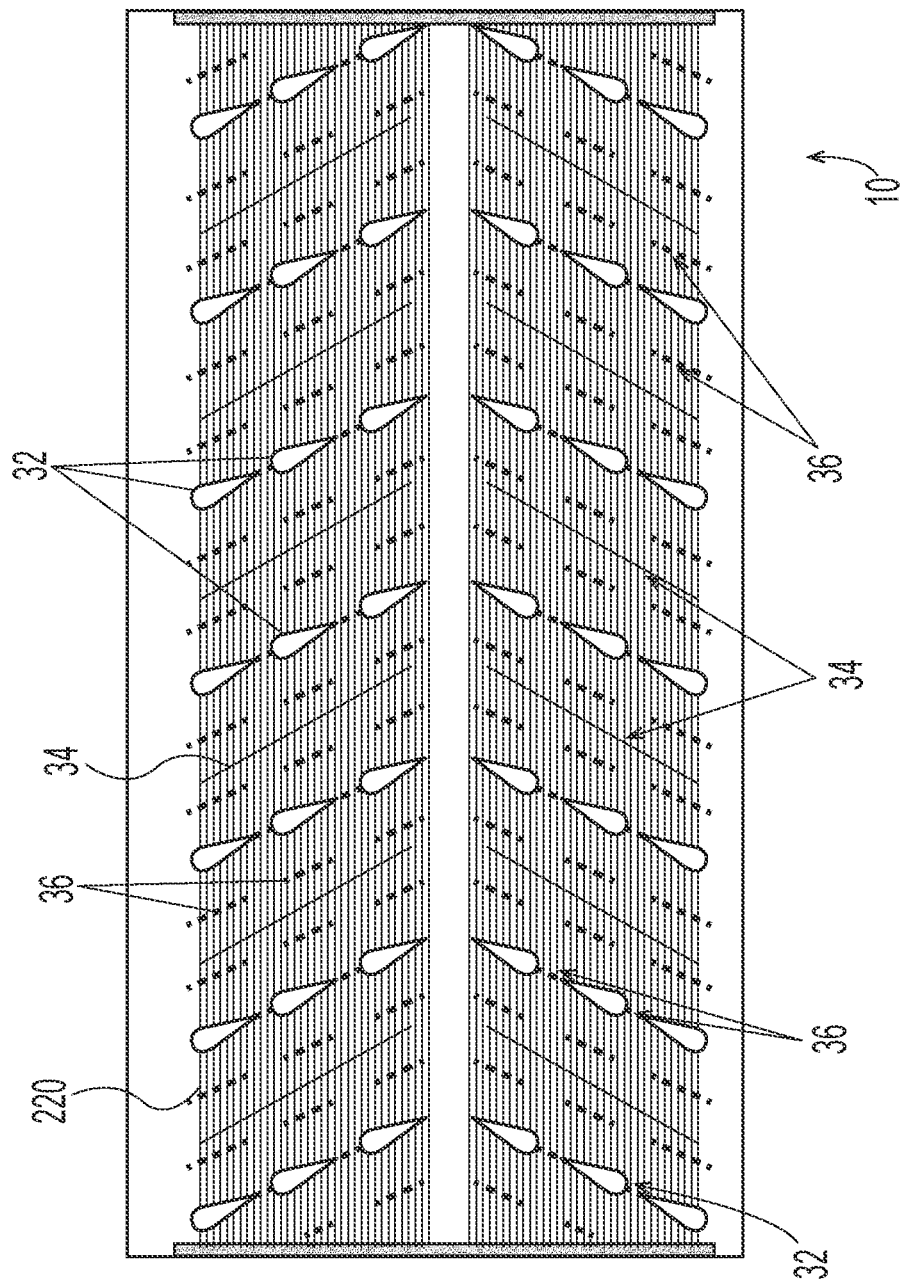
FIG. 6C is a bottom plan view of the cleaning article of FIGS. 6A, 6B1 and 6B2.
Figure 7A:
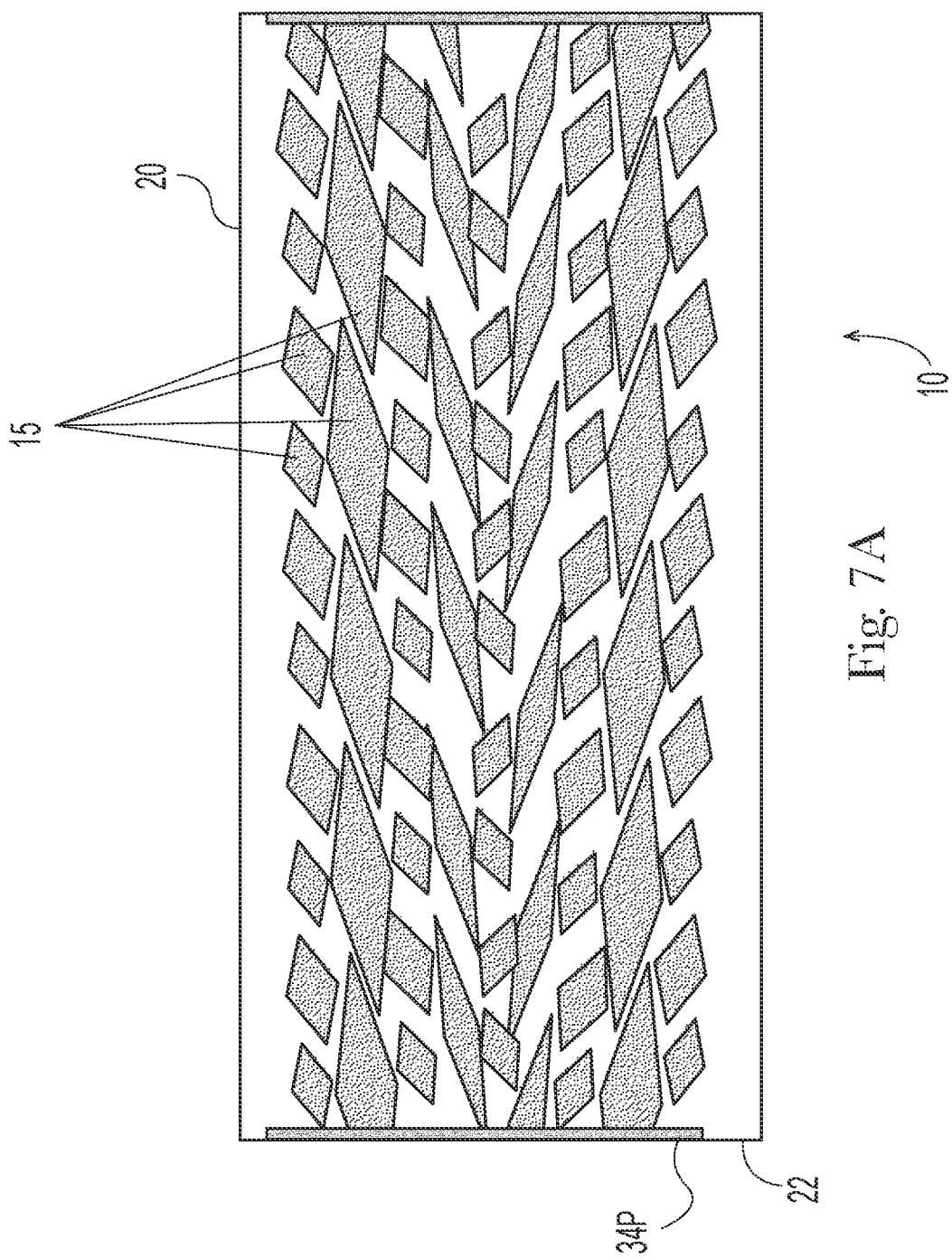
FIG. 7A is a top view of a cleaning article according to the present invention and having discrete tufts represented as diamonds, with continuous serpentine secondary bonds oriented diagonal to the transverse axis.
Figure 7C:
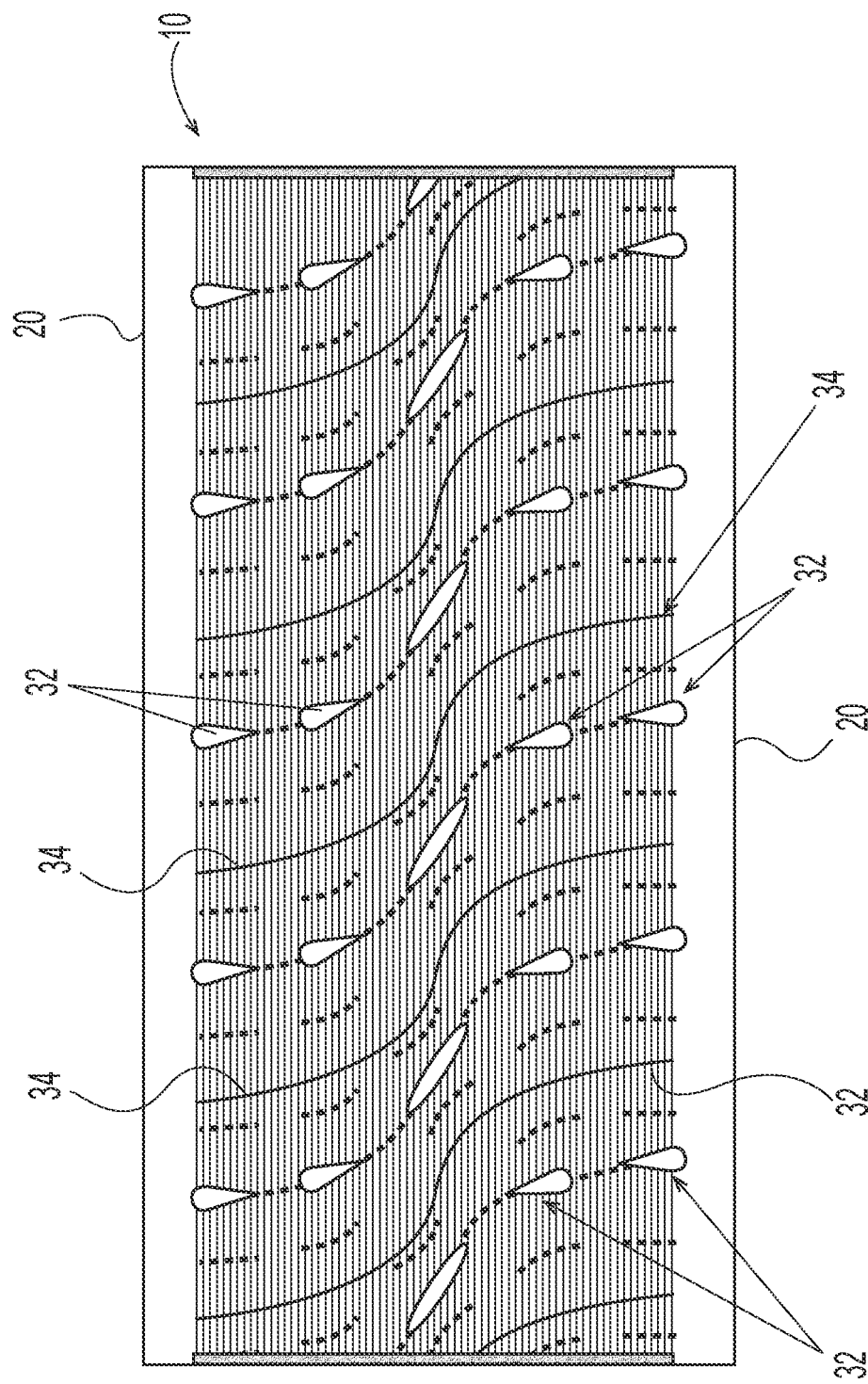
FIG. 7C is a bottom plan view of the cleaning article of FIGS. 7A, 7B1 and 7B2.
Figure 7D:
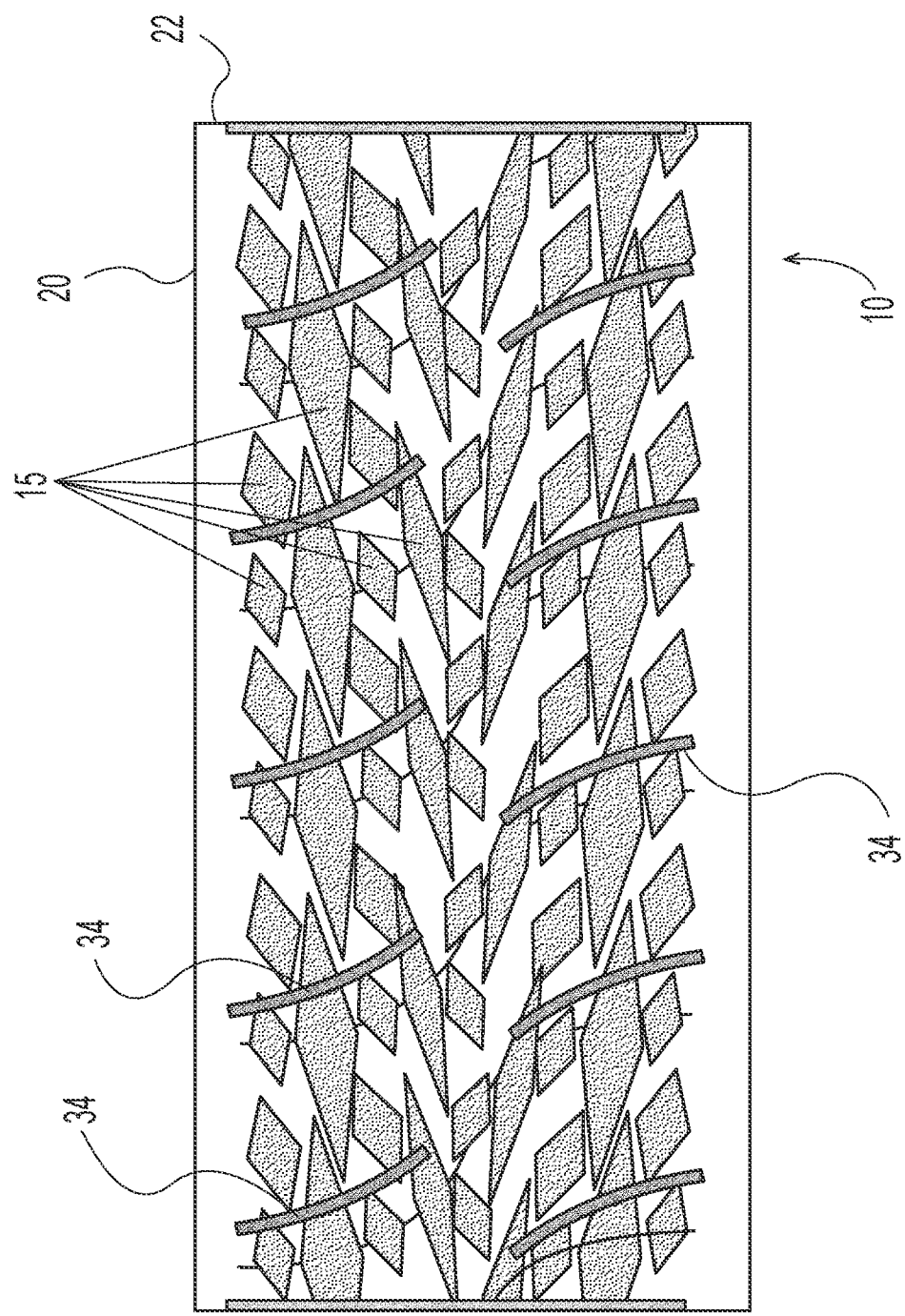
FIG. 7D is a top view of a cleaning article according to the present invention and having discrete tufts represented as diamonds, with interrupted serpentine secondary bonds.

Referring to FIGS. 6A-6C, the secondary bonds 34 may form an interrupted chevron pattern, forming a herring bone pattern oriented in the longitudinal direction. The herring bone pattern provides the benefit of reduced instantaneous amperage requirements for thermal bonding and ultrasonic bonding of the secondary bonds 34. The diagonal legs of each herring bone provide for retention of debris in the channels of the secondary bonds 34. The herring bone pattern advantageously provides for diagonally oriented channels in two different directions. The two different orientations provide the benefit of intercepting dirt in different directions as the cleaning motion occurs in various directions.

The longitudinal axis LA may be free of tufts 15 to provide for interior tuft 15 movement. If the longitudinal axis LA s free of tufts 15, this geometry further reduces the amperage required to form the secondary bonds 34.

While 12 secondary bonds 34 are shown, the invention is not so limited. More or fewer secondary bonds 34 of similar or different size and/or spacing may be utilized.

Referring to FIGS. 7A-7F, the secondary bonds 34 may form sinusoidal pattern, generally oriented in the longitudinal direction. The sinusoidal pattern provides the benefit of reduced instantaneous amperage requirements for thermal bonding and ultrasonic bonding of the secondary bonds 34. The ends of the secondary bonds 34 may be generally transversely oriented, to intercept debris during cleaning in a straight line motion, as described above with respect to FIGS. 1A-F. The diagonal center The diagonal center leg of the sinusoidal secondary bonds 35 prophetically captures and holds debris intercepted through the straight line motion.

The different orientations of the primary bonds 32 and secondary bonds 34, as taken in the transverse direction, provide for irregular spacing therebetween, and thus differently sized tufts 15, as discussed above.

Referring to FIGS. 3F and 7F, the cleaning article 10 may have both secondary bonds 34 which extending continuously between the longitudinal edges 220 of the grid of tufts and secondary bonds 34 which are interrupted and do not intercept the longitudinal axis LA. This arrangement provides the benefit that continuous channels formed by the secondary bonds 34 which extend between the longitudinal edges 220 of the grid of tufts 15 provide more space for entrapment of large debris while the interrupted channels entrap smaller debris.

Referring to FIGS. 1E2, 2E2, 3E2, 5E2, and 7E2, the cleaning article may have bridge fibers 15B. The bridge fibers 15 are joined at a proximal end to the carrier sheet and are also joined to the carrier sheet at another position along the length of the tow fiber. This arrangement provides the benefit of minimizing fiber loss on rough surfaces and provides more surface of the tow fibers in the XY plane to entrap debris. d Referring to FIG. 8, the secondary bonds 34 may be equally or unequally spaced from adjacent secondary bonds 34. The secondary bonds 34 may be of like geometry, size, angular orientation and shape or may be of mutually different geometry, size, angular orientation and/or shape. While three different sizes of tufts 15 are shown, the invention is not so limited. The cleaning article 10 may have two, three, four or more different sizes of tufts 15.

The cleaning article 10 may optionally have strips 17. The strips 17 have an aspect ratio of length to width greater than 1. Optionally, an elongate tow fiber rope oriented generally parallel to and optionally coincident the longitudinal axis LA may be used.

Referring to FIG. 9A, the cleaning article 10 may be removably attachable to a cleaning implement 70 for use with dry, wet and/or prewetted cleaning, depending upon the particular task. The cleaning implement 70 may have a head 74 for receiving the cleaning article 10 and an elongate handle 72 joined thereto. A typical floor cleaning implement 70 has a handle 72 for grasping by the user and a head 74 attached thereto, and preferably pivotally attached thereto. The head 74 moves against the floor, or other target surface. The cleaning article 10 may be removably attached to the bottom of the head 74. An attachment system may provide for removable attachment of the cleaning article 10 to a suitable and optional handle 72. Removable attachment of the cleaning article 10 to the implement 70 may be accomplished using adhesive 32, hook and loop systems, elongate sleeves, grippers, etc. Grippers and a suitable cleaning implement 70 are disclosed in commonly assigned U.S. Pat. No. 6,484,356.

Referring to FIG. 9B, the cleaning article 10 may optionally be used with a cleaning solution or other solution usable for other purposes such as treating the surface for appearance or disinfectant, etc. A floor cleaning implement 70 may allow for cleaning of the floor while the user is upright, and may also provide for spraying of cleaning solution or other liquid to the floor from a reservoir 75 through one or more nozzles 76. Suitable spray implements 70 are disclosed in commonly assigned U.S. Pat. Nos. 5,888,006; 5,988,920; 6,842,936; 7,182,537; 7,536,743; 7,676,877 and 8,186,898. The cleaning solution may be pre-applied to the cleaning article 10, creating a pre-moistened cleaning article 10 or may be contained within a separate reservoir 75 for dosing onto the cleaning article 10 and/or target surface. The cleaning solution may comprise a majority water, and at least about 0.5, 2, 5 or 10 weight percent solids, or at least about 30 or 50 weight percent aqueous solvents, non-aqueous solutions or mixtures thereof. A suitable implement 70 having an optional vacuum is disclosed in U.S. Pat. No. 7,137,169.

Referring to FIG. 9C, the implement 70 may have a handle 72 and head 74 used in fixed relationship and comprising one or more tines 73. The tines 73 may be inserted into sleeves in the cleaning article 10. This arrangement allows the cleaning article 10 to be conveniently used as a duster for cleaning small object and tights spaces 31. Suitable implements 70 for a duster type cleaning article 10 are disclosed in commonly assigned U.S. Pat. No. 8,578,564 and Pat. No. D674,949 S.

If desired, the cleaning article 10 may be used with and removably attached to an autonomously moving robot or drone. Suitable examples of robots and drones for use with the cleaning article of the present invention are found in commonly assigned patents U.S. Pat. Nos. 6,941,199; 6,810,305; 6,779,217; 6,481,515; 6,459,955 and Ser. No. 14/992,195, filed Jan. 11, 2016, P&G Case 14189. Examples of robots for use with wet and dry cleaning are found in U.S. Pat. Nos. 7,389,156; 8,774,966 and 8,855,813. A data control system may be utilized with the cleaning article 10, as described in U.S. Pat. No. 7,431,524.

The cleaning article 10 may also be used manually, without a handle 72 or implement 70. If desired, various cleaning articles 10 described herein may be packaged and sold in a kit. This arrangement provides the benefit that the user has a choice of different cleaning articles 10 for different tasks. For example, if desired, plural sizes of the cleaning articles 10 may be sold together as a single kit. This arrangement allows the user to select the particular cleaning article 10 best suited for the immediate task.

The cleaning article 10 may be made according to any of the following nonlimiting paragraphs in any combination thereof.

A. A cleaning article 10 bounded by edges defining an XY plane and a Z-direction perpendicular thereto, a longitudinal axis LA defining a longitudinal direction and a transverse axis TA defining a transverse direction, said cleaning article 10 comprising:

a carrier sheet having a first side and a second side opposed thereto, and a plurality of discrete tow fibers joined to said first side of said carrier sheet by a plurality of primary bonds 32 and extending outwardly therefrom in the Z-direction to have a tow thickness in the z-direction, a plurality of elongate secondary bond disposed on at least one plurality of tow fibers and having a secondary bond thickness in the Z-direction, said secondary bond thickness being less than said tow thickness in the Z-direction, said secondary bond bridging at least some of said tow fibers, and a plurality of elongate slits 36 through said carrier sheet and said tow fibers, said slits 36 being disposed between a said primary bond and a said secondary bond.

B. A cleaning article 10 bounded by alternating longitudinal edges 20 and transverse edges defining an XY plane and a Z-direction perpendicular thereto, a longitudinal axis LA defining a longitudinal direction and a transverse axis TA defining a transverse direction, said cleaning article 10 comprising:

a carrier sheet having a first side and a second side opposed thereto, and a plurality of discrete spaced apart tufts 15 of tow fibers joined to said first side of said carrier sheet by a plurality of primary bonds 32 and extending outwardly therefrom in the Z-direction to have a tuft thickness in the Z-direction, a plurality of elongate secondary bonds 34 having a secondary bond thickness in the Z-direction, said secondary bond thickness being less than said tuft thickness, each said secondary bond bridging at least two adjacent tufts 15 of tow fibers, and a plurality of elongate slits 36 through said carrier sheet and said tow fibers, said slits 36 being unequally transversely spaced between two adjacent bonds.

C. A cleaning article 10 bounded by alternating longitudinal edges 20 and transverse edges 22 defining an XY plane and a Z-direction perpendicular thereto, a longitudinal axis LA defining a longitudinal direction and a transverse axis TA defining a transverse direction, said cleaning article 10 comprising:

a carrier sheet having a first side and a second side opposed thereto, and a plurality of discrete spaced apart tufts 15 of tow fibers joined to said first side of said carrier sheet by a plurality of primary bonds 32 and extending outwardly therefrom in the Z-direction to have a tuft thickness in the Z-direction, a plurality of elongate secondary bonds 34 having a secondary bond thickness in the Z-direction, said secondary bond thickness being less than said tuft thickness, each said secondary bond bridging at least two adjacent tufts 15 of tow fibers, said secondary bond thickness being less than said tuft thickness, each said secondary bond bridging at least two adjacent tufts 15 of tow fibers, and a first plurality of elongate slits 36 through said carrier sheet and said tow fibers, said first plurality of slits 36 being spaced a first distance from a transversely adjacent secondary bond, and a second plurality of elongate slits 36 through said carrier sheet and said tow fibers, said second plurality of slits 36 being spaced a second distance from a transversely adjacent secondary bond, said second distance being greater than said first distance.

D. A cleaning article 10 according to paragraph A wherein said plurality of tow fibers comprises plural lines of tow fibers oriented in said transverse direction.

E. A cleaning article 10 according to paragraphs A, B and C wherein a plurality of said slits 36 are unequally transversely spaced between a respective, said adjacent primary bond and a respective, said adjacent secondary bond.

F. A cleaning article 10 according to paragraphs A, B, C and E wherein said primary bonds 32 are elongate, and said elongate primary bonds 32, said elongate secondary bonds 34 and said elongate slits 36 are substantially parallel.

G. A cleaning article 10 according to paragraphs A, B, C, E and F wherein said primary bonds 32 are elongate, and said elongate primary bonds 32, said elongate secondary bonds 34 and said elongate slits 36 are substantially parallel, and further comprising a plurality of slits 36 transversely disposed between secondary bonds 34.

H. A cleaning article 10 according to paragraphs A, B, C, E, F and G wherein said primary bonds 32 are elongate, and said elongate primary bonds 32, said elongate secondary bonds 34 and said elongate slits 36 are substantially parallel, and further comprising bridge fibers joined to said carrier sheet and not having a free end.

I. A cleaning article 10 according to paragraphs A, B, C, E, F, G and H wherein said primary bonds 32 are elongate, and said elongate primary bonds 32, said elongate secondary bonds 34 and said elongate slits 36 are substantially parallel, said secondary bonds 34 being generally rectilinear and oriented diagonal to said longitudinal axis LA.

J. A cleaning article 10 according to paragraphs A, B, C, E, F, G, H and I further comprising a channel on said carrier between said tufts 15, said channel being free of said tufts 15, said channel being juxtaposed with said longitudinal axis LA.

K. A cleaning article 10 according to paragraphs A, B, C, E, F, G, H, I and J further comprising a channel on said carrier between said tufts 15, said channel being free of said tufts 15, said channel being juxtaposed with said longitudinal axis LA, said channel having a tacky coating 39 thereon.

L. A cleaning article 10 according to paragraphs A, B, C, E, F, G, H, I, J and K further comprising a channel on said carrier between said tufts 15, said channel being free of said tufts 15, said channel being juxtaposed with said longitudinal axis LA wherein at least some of said primary bonds 32, said secondary bonds 34 and said slits 36 intercept said channel.

M. A cleaning article 10 according to paragraphs A, B, C, E, F, G, H, I, J, K and L having a first plurality of elongate primary bonds 32 with a first length in said transverse direction and a second plurality of elongate primary bonds 32 juxtaposed with said longitudinal axis LA and having a second length in said transverse direction, said second length being greater than said first length.

N. A cleaning article 10 according to paragraphs A, B, C, E, F, G, H, I, J, K, L and M having a first plurality of secondary bonds 34 with a first secondary bond width and a second plurality of secondary bonds 34 with a second secondary bond width, said second secondary bond width being greater than said first secondary bond width.

O. A cleaning article 10 according to paragraphs A, B, C, E, F, G, H, I, J, K, L, M and N having a first plurality of secondary bonds 34 with a first secondary bond width and a second plurality of secondary bonds 34 with a second secondary bond width, said second secondary bond width being greater than said first secondary bond width, wherein said bonds of said first plurality and said second plurality are generally transversely oriented and alternatingly disposed in said longitudinal direction.

P. A cleaning article 10 according to paragraphs A, B, C, E, F, G, H, I, J, K, L, M, N and O further comprising a second plurality of slits 36, said second plurality of slits 36 being coincident and disposed upon a like plurality of secondary bonds 34.

Q. A cleaning article 10 according to paragraphs A, B, C, E, F, G, H and I wherein said tufts 15 are disposed in a rectangular grid having alternating longitudinal edges 220 and transverse edges 222, said cleaning article 10 comprising a first plurality of secondary bonds 34 extending substantially continuously between said longitudinal edges 220 of said grid and a second plurality of said secondary bonds 34 extending from each said longitudinal edge 220 of said grid and not intercepting said longitudinal axis LA.

R. A cleaning article 10 according to paragraphs A, B, C, E, F, G, H, I, J, K, L, M, N, O, P and Q wherein said tufts 15 are disposed in a rectangular grid having alternating longitudinal edges and transverse edges 222, said cleaning article 10 comprising a first plurality of secondary bonds 34 extending substantially continuously diagonally between said longitudinal edges 220 of said grid and a second plurality of said secondary bonds 34 extending diagonally from each said longitudinal edge 220 of said grid and not intercepting said longitudinal axis LA said secondary bonds 34 of said first plurality of said secondary bonds 34 and said second plurality of said secondary bonds 34 being alternating disposed with one another.

S. A cleaning article 10 according to paragraphs A, B, C, E, F, G, H, I, J, K, L, M, N, O, P and Q wherein said tufts 15 are disposed in a rectangular grid having alternating longitudinal edges 220 and transverse edges 222, and said secondary bonds 34 intercept at least one said longitudinal edge 220 of said grid and extend generally perpendicular to said longitudinal axis LA.

T. A cleaning article 10 according to any preceding paragraph removably joined to a cleaning implement 70.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm" and a pressure disclosed as "about 1100 kPa" is intended to include 1103.2 kPa.

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern. All limits shown herein as defining a range may be used with any other limit defining a range. That is the upper limit of one range may be used with the lower limit of another range, and vice versa.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A cleaning article bounded by edges defining an XY plane and a Z-direction perpendicular thereto, a longitudinal axis defining a longitudinal direction and a transverse axis defining a transverse direction, said cleaning article comprising:
   a carrier sheet having a first side and a second side opposed thereto, and
   a plurality of discrete spaced apart tufts of tow fibers joined to said first side of said carrier sheet by a plurality of primary bonds and extending outwardly therefrom in the Z-direction to have a tuft thickness in the z-direction,
   a plurality of elongate secondary bonds disposed on at least a portion of said discrete spaced apart tufts and having a secondary bond thickness in the Z-direction, said secondary bond thickness being less than said tuft thickness in the Z-direction, each said secondary bond bridging at least two adjacent spaced apart tufts of said tow fibers, and a plurality of elongate slits through said carrier sheet and said tow fibers, said slits being disposed between a said primary bond and a said secondary bond, wherein said primary bonds are elongate, and said elongate primary bonds, said elongate secondary bonds and said elongate slits are substantially parallel.

2. A cleaning article according to claim 1 wherein said plurality of tow fibers comprises plural lines of tow fibers oriented in said transverse direction.

3. A cleaning article according to claim 1 wherein a plurality of said slits are unequally transversely spaced between one said primary bond and one said secondary bond.

4. A cleaning article according to claim 1 further comprising a plurality of slits transversely disposed between secondary bonds.

5. A cleaning article according to claim 1 further comprising bridge fibers joined to said carrier sheet and not having a free end.

6. A cleaning article according to claim 1 wherein said secondary bonds are generally rectilinear and oriented diagonal to said longitudinal axis.

7. A cleaning article bounded by edges defining an XY plane and a Z-direction perpendicular thereto, a longitudinal axis defining a longitudinal direction and a transverse axis defining a transverse direction, said cleaning article comprising:
- a carrier sheet having a first side and a second side opposed thereto, and
- a plurality of discrete spaced apart tufts of tow fibers joined to said first side of said carrier sheet by a plurality of primary bonds and extending outwardly therefrom in the Z-direction to have a tuft thickness in the z-direction,
- a plurality of elongate secondary bonds disposed on at least a portion of said discrete spaced apart tufts and having a secondary bond thickness in the Z-direction, said secondary bond thickness being less than said tuft thickness in the Z-direction, each said secondary bond bridging at least two adjacent spaced apart tufts of said tow fibers, and
- a plurality of elongate slits through said carrier sheet and said tow fibers, said slits being disposed between a said primary bond and a said secondary bond,
- wherein said primary bonds are elongate, and said elongate primary bonds, said elongate secondary bonds and said elongate slits are substantially parallel, and further comprising a plurality of slits transversely disposed between secondary bonds, and wherein said plurality of tow fibers comprises plural lines of tow fibers oriented in said transverse direction.

8. A cleaning article according to claim 7 wherein a plurality of said slits are unequally transversely spaced between one said primary bond and one said secondary bond.

9. A cleaning article according to claim 7 further comprising bridge fibers joined to said carrier sheet and not having a free end.

10. A cleaning article according to claim 7 wherein said secondary bonds are generally rectilinear and oriented diagonal to said longitudinal axis.

11. A cleaning article bounded by edges defining an XY plane and a Z-direction perpendicular thereto, a longitudinal axis defining a longitudinal direction and a transverse axis defining a transverse direction, said cleaning article comprising:
- a carrier sheet having a first side and a second side opposed thereto, and
- a plurality of discrete spaced apart tufts of tow fibers joined to said first side of said carrier sheet by a plurality of primary bonds and extending outwardly therefrom in the Z-direction to have a tuft thickness in the z-direction,
- a plurality of elongate secondary bonds disposed on at least a portion of said discrete spaced apart tufts and having a secondary bond thickness in the Z-direction, said secondary bond thickness being less than said tuft thickness in the Z-direction, each said secondary bond bridging at least two adjacent spaced apart tufts of said tow fibers, and
- a plurality of elongate slits through said carrier sheet and said tow fibers, said slits being disposed between a said primary bond and a said secondary bond,
- wherein said primary bonds are elongate, and said elongate primary bonds, said elongate secondary bonds and said elongate slits are substantially parallel, wherein said secondary bonds are generally rectilinear and oriented diagonal to said longitudinal axis; and
- wherein said plurality of tow fibers comprises plural lines of tow fibers oriented in said transverse direction.

12. A cleaning article according to claim 11 wherein a plurality of said slits are unequally transversely spaced between one said primary bond and one said secondary bond.

13. A cleaning article according to claim 11 further comprising bridge fibers joined to said carrier sheet and not having a free end.

\* \* \* \* \*